(12) United States Patent
Ruegenberg et al.

(10) Patent No.: US 10,962,394 B2
(45) Date of Patent: Mar. 30, 2021

(54) MEASUREMENT OF FLUID FLOW

(71) Applicant: DIONEX SOFTRON GMBH, Germering (DE)

(72) Inventors: Gervin Ruegenberg, Munich (DE); Martin Rendl, Munich (DE)

(73) Assignee: Dionex Softron GMBH, Germering (DE)

( * ) Notice: Subject to any disclaimer, the term of this patent is extended or adjusted under 35 U.S.C. 154(b) by 274 days.

(21) Appl. No.: 16/114,523

(22) Filed: Aug. 28, 2018

(65) Prior Publication Data
US 2019/0064125 A1 Feb. 28, 2019

(30) Foreign Application Priority Data
Aug. 28, 2017 (DE) .................. 10 2017 119 667.6

(51) Int. Cl.
*G01F 1/696* (2006.01)
*G01F 25/00* (2006.01)
(Continued)

(52) U.S. Cl.
CPC .......... *G01F 1/6965* (2013.01); *G01F 1/6842* (2013.01); *G01F 1/6847* (2013.01);
(Continued)

(58) Field of Classification Search
CPC .. G01F 25/0007; G01F 1/6842; G01F 1/6847; G01F 1/6888; G01F 1/69;
(Continued)

(56) References Cited

U.S. PATENT DOCUMENTS 3,917,531 A 11/1975 Magnussen
4,843,881 A * 7/1989 Hubbard ............... G01F 1/6847
73/204.16
(Continued)

FOREIGN PATENT DOCUMENTS

CN 101213425 A 7/2008
CN 103453959 A 12/2013
(Continued)

OTHER PUBLICATIONS

De Bree et al., "Bi-directional fast flow sensor with a large dynamic range," J. Micromech. Microeng., 9, 186-189, 1999.

*Primary Examiner* — Benjamin R Schmitt

(57) ABSTRACT

A method for measuring a flow of a fluid in a tube includes heating the fluid in the tube with a heating element. A first signal is measured with a first temperature sensing element at a first location. A second signal is measured with a second temperature sensing element at a second location. At least one temperature signal is calculated based on the first signal and the second signal. The at least one temperature signal includes a difference temperature signal and a sum temperature signal. The difference temperature signal is calculated based on a difference between the second signal and the first signal. The sum temperature signal is calculated based on a sum of the second signal and the first signal. The flow is derived based on the difference temperature signal, the sum temperature signal, or a combination thereof.

22 Claims, 10 Drawing Sheets

(51) Int. Cl.
*G01F 1/684* (2006.01)
*G01F 1/688* (2006.01)
*G01F 1/69* (2006.01)
*G01N 30/30* (2006.01)
*G01N 30/36* (2006.01)
*G01N 30/02* (2006.01)
*G01N 30/32* (2006.01)

(52) U.S. Cl.
CPC .............. *G01F 1/6888* (2013.01); *G01F 1/69* (2013.01); *G01F 25/0007* (2013.01); *G01N 30/30* (2013.01); *G01N 30/36* (2013.01); *G01N 2030/027* (2013.01); *G01N 2030/324* (2013.01); *G01N 2030/326* (2013.01)

(58) Field of Classification Search
CPC ......... G01F 1/6965; G01F 1/68; G01N 30/36; G01N 30/30; G01N 2030/027; G01N 2030/324; G01N 2030/326; G01N 30/32
USPC .......................................... 73/204.11, 204.19
See application file for complete search history.

(56) References Cited

U.S. PATENT DOCUMENTS

| | | |
|---|---|---|
| 5,036,701 A | 8/1991 | van der Graaf |
| 5,936,701 A | 8/1999 | Sartor |
| 6,550,324 B1 | 4/2003 | Mayer et al. |
| 7,490,511 B2 | 2/2009 | Mayer et al. |
| 7,674,375 B2 | 3/2010 | Gerhardt et al. |
| 7,927,477 B2 | 4/2011 | Paul et al. |
| 8,679,333 B2 | 3/2014 | Gerhardt et al. |
| 2009/0090174 A1 | 4/2009 | Paul et al. |
| 2013/0319105 A1 | 12/2013 | Tanaka et al. |
| 2014/0373621 A1* | 12/2014 | Schirm .............. G01N 33/0031 73/204.11 |

FOREIGN PATENT DOCUMENTS

| | | |
|---|---|---|
| CN | 104736977 A | 6/2015 |
| JP | 2006010322 A | 1/2006 |
| WO | 2011075571 A1 | 6/2011 |

\* cited by examiner

MEASUREMENT OF FLUID FLOW

CROSS REFERENCE TO RELATED APPLICATION

This application claims the priority benefit under 35 U.S.C. § 119 to German Patent Application No. 10 2017 119 667.6, filed on Aug. 28, 2017, the disclosure of which is incorporated herein by reference.

FIELD OF THE INVENTION

The present invention generally relates to the measurement of a fluid flow in a tube. The present invention is described with a particular focus on the measurement of fluid flow in liquid chromatography—and more particularly high performance liquid chromatography (HPLC).

BACKGROUND

What is applied in HPLC are pumps that generate a solvent flow with a defined flow rate (generally referred to as a flow in the following). In so-called isocratic applications, the solvent composition is constant. In contrast to that, in solvent gradients (referred to in short as gradients in the following) two or more solvents are combined with a settable mixing ratio, wherein the mixing ratio is varied in a defined, predetermined manner depending on the time. The use of gradients has great advantages with respect to chromatography and is therefore very widely used in HPLC, in particular in the low flow range.

Generally, in field of liquid chromatography (HPLC=high performance liquid chromatography), the low flow range relates to a flow range with flow rates between just a few nL/min (nanoliters per minute) up to approximately 100 µL/min (microliters per minute). Commonly, a distinction is made here between the nano HPLC with flow rates between approximately 10 nL/min (nanoliters per minute) and approximately 2 µL/min, the capillary HPLC with flow rates between approximately 1 µl/min and approximately 10 µL/min, and the micro HPLC with flow rates between approximately 5 µL/min and 100 µL/min.

In most applications, the total flow of the mixed solvent is constant, but it can also be varied for special purposes in a defined, predetermined manner depending on the time.

For reasons of simplification, so-called binary gradients, i.e. mixtures of 2 solvents, are regarded in the following explanation. The observations also apply in an analogous manner to gradients having more than 2 solvents.

In HPLC, the requirements with respect to the precision of the generated flow rates and to the mixing ratios are very high. Even more important than absolute precision is reproducibility. Here, deviations in the per mil range can already result in inacceptable changes in retention time.

According to the state of the art, the gradients for HPLC are generated either by low-pressure gradient pumps (low pressure gradient=LPG) or by high-pressure gradient pumps (high pressure gradient=HPG). Among other things, HPG pumps have the advantage that the combination of the different solvent flows occurs only at the outlet of the pump, so that changes in mixing ratios take effect immediately. This may be particularly advantageous for the low flow range. In LPG pumps, the mixing occurs at the pump inlet. LPG pumps will not be regarded in any more detail in the below consideration.

When gradients are generated according to the HPG principle, each solvent is conveyed through a dedicated pump block that provides the desired partial flow. The partial flows are combined inside a mixer at the high-pressure side, i.e. near the outlet of the pump, thus resulting in the total flow. The mixing ratio is set by controlling the pump blocks in a suitable manner.

The following observations refer to binary pumps that work with two solvents. This is the simplest case that is most frequently used in the low flow range. Pumps with more than two solvents can be realized in the exact same manner, only that in that case almost all components, such as pump blocks and flow sensors, need to be correspondingly provided more than twice.

A binary HPG pump consists of two pump blocks, wherein the first block conveys a first solvent and the second block conveys a second solvent, with these two partial flows being combined and mixed at the pump outlet. The generation of solvent gradients with a binary HPG pump is explained based on the example of a linear gradient of 0 to 100%. Here, the total flow at the pump outlet is to be constant, and the concentration of the second solvent is to be gradually increased from 0% to 100%.

For this purpose, initially only the first block conveys the first solvent, while the second block stands still. Then, the conveying speed of the first block is continuously decreased while the conveying speed of the second block is increased to the same extent, until finally the first block stands still and the second block provides the entire flow. The sum of the two partial flows, and thus the total flow, is constant in such a gradient.

There are some general problems and challenges in the prior art, particularly occurring in low flow conditions.

In the so-called analytical HPLC, the required flow rates lie in the order of magnitude of just few milliliters per minute. According to the state of the art, such flows are generated by piston pumps based on the displacement principle. Here, the movements of the piston are controlled in such a manner that the required volume per time is displaced, thus resulting in the desired flow. Usually it is not necessary to measure or control the generated flows.

In the low flow range, there is the problem that the movements of the piston cannot always be controlled in such a precise manner that exactly the desired flows are displaced. In addition to that, a relevant part of the displaced flow can be lost due to unavoidable leaks, for example of the pump seals or the valves. Further, the amount of the liquid that is present inside the pump can vary, for example as a result of changes in temperature and pressure that affect the density of the liquid. The flow that is provided at the exit of the pump is accordingly increased or decreased in the course of such volume variations. In the low flow range, in particular in the range of nano HPLC, the flow errors that are caused as a result of this lie in the same order of magnitude as the desired flows themselves and must therefore be compensated for.

The flow may be controlled with the help of flow sensors. In low flow pumps according to the state of the art, the flows of the individual pump blocks are therefore measured by means of respective sensors. In the event that the flows differ from the desired values, the conveying speeds of the pump blocks are adjusted by corresponding control circuits so as to compensate for the errors.

In this manner, the above-mentioned disturbing effects can be compensated for. In this case, the precision and reproducibility of the flow generation is determined mainly by the precision or reproducibility of the sensors. The characteristics of the pump blocks only play a subordinate role, as they can be largely compensated for by means of the control.

Thus, what is desirable for low flow pumps are sensors that can measure the flows of the pump blocks with a high precision and above all with a high level of reproducibility.

What is usually used for the measurement of the flows in nano HPLC and capillary HPLC are thermal flow sensors or flow sensors according to the shunt principle. There are numerous publications for realizing such controlled pumps, in particular for the low flow range.

U.S. Pat. No. 7,674,375 by Waters Company (see FIG. 1) describes a solution in which a controller 120 controls the two pumps 102 and 104 which generate the two partial flows. They pass the two fluidic resistance elements 108 and 114 and are combined at the outlet by the mixer 110. The pressure drop at each resistance element is proportional to the corresponding flow, and thus represents a measure for the actual partial flow. In total 3 pressure sensors 106, 112 and 116 are provided for measuring the pressure drops, so that the controller 120 can determine the pressure drop at the upper capillary as the difference between the signals of the pressure sensors 106 and 116, and analogously can determine the pressure drop at the lower capillary as the difference between the signals of the pressure sensors 112 and 116.

The partial flows are obtained by dividing the pressure drop by the (previously determined) flow resistance of the respective resistance element.

Exactly the same measuring principle is also described in U.S. Pat. No. 7,927,477 B2 by AB Sciex LLC Company, as well as further members of this patent family.

The measurement by means of dedicated flow sensors is already known from U.S. Pat. No. 3,917,531 by Spectra Physics Company (see FIG. 2). Here, a flow transducer 23 or 23' that measures the actual flow is used in every flow path.

The signals of the sensors that are referred to as "flow transducers" are transferred to the control devices 26 and 26' that control the motors 16 and 16' in such a manner that the flows correspond to the desired values.

This solution is also claimed by various substantially later patents, such as for example U.S. Pat. No. 8,679,333 B2.

Thermal flow sensors according to the state of the art, which can measure the flows that are of interest in the low flow range, are commercially available, for example from Bronkhorst BV Company, Netherlands, or Sensirion AG Company, Switzerland.

However, such prior art flow sensors have certain problems and limitations.

Since flow measurement and flow control by means of flow sensors may also be of interest for the present invention, some aspects of this technology will be regarded in more detail in the following.

There are certain requirements for the flow sensors, which requirements may depend on the field the flow sensors are used in.

HPLC pumps are supposed to cover a flow and pressure range that is as large as possible, so that they may be used versatilely for a wide range of different HPLC columns. For low flow pumps, this requirement also applies to the used flow sensors.

Here, it is advantageous for HPLC that the precision and above all the reproducibility of all processes is to be as high as possible. Thus, the total flow as well as the mixing ratio are advantageously maintained so as to be extremely reproducible.

As has already been explained, in HPLC pumps for the low flow range according to the state of the art, each partial flow is measured by a flow sensor, and the corresponding pump block is controlled by a control circuit in such a manner that the measured flow corresponds to the desired value as precisely as possible. In the event that measuring errors occur in the flow sensors, the actually provided partial flows are correspondingly controlled in a faulty manner. In this case, the total flow as well as the mixing ratio may be flawed.

As has already been mentioned, gradients are often run in HPLC, i.e. the mixing ratio of the solvents is varied in the range between 0 and 100% during each measurement cycle depending on the time. At 0 or 100%, one of the partial flows becomes zero. If in that case the respective pump block was simply stopped, changes in pressure and temperature as well as possible leaks would result in undesired flows, wherein also a negative partial flow, i.e. in the direction of the pump block, could occur. In order to avoid this, each partial flow must always be actively controlled.

If a partial flow is zero, a percentage accuracy specification is not possible for the flow sensor. In this case, what may be looked at instead is the worst case zero signal that is provided by the sensor at actual flow=zero. The zero signal comprises an offset error (mean value) and noise. These values yield the lowest measurable flow, which is just enough to be reliably differentiated from the zero signal.

In the following, the ratio between this lowest and the highest measurable or usable flow is referred to as the dynamic range of the sensor.

The flow rate range in which the HPLC pump with flow sensors can be operated in an expedient manner is determined by the dynamic range of the flow sensors. As a rule of thumb for a sufficient precision and reproducibility, the total flow of the pump should be higher by at least 2 orders of magnitude than the lowest measurable flow of the sensors. Thus, the operating range of the pump (wherein the range is the quotient of the highest and smallest flow rate) is lower than the dynamic range of the used flow sensors by the factor 100.

The above considerations apply for all types of flow sensors, be it thermal flow sensors or flow sensors according to the shunt principle or any other kind of flow sensors.

In the following specific limitations of flow measurement and flow control according to the shunt principle are considered.

The flow measurement according to the shunt principle corresponds to the measurement of electric current according to the shunt principle. Here, a known resistance is inserted into the current-carrying conductor, and the voltage drop at the resistance is measured. The current then results as the quotient of the measured voltage and the resistance value.

In analogy to that, the partial flow to be measured is guided through a known fluidic resistance, and the pressure drop at the resistance element is measured. Then, the flow rate of the partial flow results as the quotient of the measured pressure drop and the fluidic resistance.

The overall structure of a binary gradient pump with flow measurement and regulation according to the shunt principle is shown in FIG. 1 (state of the art). The partial flows that are provided by the two pump blocks 102 or 104 pass the fluidic resistance elements 108 or 114 and are subsequently combined by the mixer 110. The two pressure sensors 106 and 112 measure the pressures at the entrances of the resistance elements or at the exits of the pump blocks. In the following, they are referred to as primary pressures. The pressure sensor 116 measures the pressure behind the resistance elements or at the exit of the entire pump. In the following, it is referred to as the system pressure.

The pressure drop at the resistance element 108 is the difference between the signal of the primary pressure sensor 106 and the system pressure sensor 116. For the resistance element 114, the pressure drop can be gathered from the signals of the primary pressure sensor 112 and the system pressure sensor 116. The system controller determines these pressure drops, calculates the measured partial flows based on them, and controls the pump blocks in such a manner that the measured partial flows correspond to the desired values.

Suitable fluidic resistance elements are for example capillaries with a relatively small internal diameter or with a filling made of porous material. The liquid that flows through them creates a pressure drop that depends on the geometry of the resistance element, the viscosity of the liquid, as well as on the flow rate. If the resistance element is designed in a suitable manner, the relation between the pressure drop and the flow is approximately linear. If the characteristics of the resistance elements as well as the viscosities of the liquids are known, the partial flows can be calculated from the pressure drops. At that, the resistance elements have to be designed in such a manner that in the flow range of interest the pressure drops are high enough so that they can be measured with sufficient accuracy. On the other hand, the resistance elements must not generate too much backpressure, since the pump blocks have to provide this additional pressure.

Usual pressure sensors for high pressures, as they are used in HPLC, are constructed in such a manner that they measure the pressure difference to the ambient pressure, or the absolute pressure, if necessary. However, what is of interest for determining the flow is the pressure drop, i.e. the pressure difference between the entrance and the exit of the resistance element. Differential pressure sensors that can measure a relatively small difference between two very high pressures with good precision would be technically extremely challenging and are not readily available at reasonable costs. Thus, for the flow measurement according to the shunt principle, individual conventional pressure sensors are used, and the differences are calculated either electronically or by means of software, as shown in FIG. 1.

As has already been explained, extremely high requirements have to be met in HPLC concerning the precision and in particular the reproducibility of the partial flows. For this reason, the pressure drops must be measured in an extremely precise and reproducible manner. Good and readily available pressure sensors reach precisions in the order of magnitude of 0.1% of the maximum pressure. However, what is important in the flow measurement according to the shunt principle is the (comparatively low) pressure difference that is created at the resistance element. In this way, inaccuracies of the pressure sensors correspondingly have a stronger effect percentagewise. This will be explained based on an example.

Assume that the pump blocks can provide primary pressures of up to 1000 bar, and the system is designed for a nominal flow of 500 nL/min and a nominal pressure of 800 bar. Here, the nominal pressure is the maximal system pressure that can be reached at the nominal flow.

The resistance elements are designed in such a manner that a maximum pressure drop of 200 bar occurs in them at nominal conditions. This pressure drop is a measure for the actual flow and is measured with the help of the pressure sensors. At that, the primary pressure and system pressure sensors must be designed for 1000 bar. Thus, with pressure sensors with a precision of 0.1%, measuring errors of up to ±1 bar per sensor have to be expected, which may add up to ±2 bar in the most unfavorable case. Based on a pressure difference of 200 bar, this corresponds to an error of up to ±1%, which leads to a flow error of up to ±1%. This is sufficient for chromatographic purposes, as the reproducibility of measurement is usually better by about 1 to 2 orders of magnitude than the absolute precision, thus lying between 0.01% and 0.1%.

If it is desired is to work with the same system with a lower total flow, for example 100 nL/min instead of 500 nL/min, the pressure difference to be measured is now only 40 bar. Now, the maximal measuring error of ±2 bar already has a resulting flow error of ±5%. If the flow setting is even lower, the error increases further.

Conversely, the same system can also provide flows that are higher than the nominal flow. In this case, the pressure differences correspondingly increase at the resistance elements, for example to 600 bar with 1500 nL/min. Accordingly, in that case the system can only provide a maximal pressure of 400 bar.

Thus, the usable flow range of the system is limited at the lower end by the increasing measuring error, and at the upper end by the available column pressure. Depending on what amount of flow errors and which restrictions regarding the column pressure are considered acceptable, the flow measurement of such a system has a dynamic range in the order of magnitude of 1:1000 to 1:2000. This corresponds to a pump operating range from 1:10 to 1:20.

In the following specific limitations of flow measurement and flow control by thermal flow sensors are considered.

Thermal flow sensors for the low flow range according to the state of the art work with a capillary through which the flow to be measured is guided. The capillary is heated by at least one heating element that is attached outside the capillary in the middle of the measuring zone. Temperature sensors are attached outside at the capillary at both ends of the measuring zone, i.e. in the direction of the capillary axis, symmetrically in front and behind the heating element. If there is no flow flowing through the capillary, a symmetrical temperature profile is formed in the measuring zone, since the heat is dissipated evenly towards both sides, i.e. both temperature sensors have the same temperature. If a flow is guided through the capillary, it causes an additional heat transport in flow direction. In this manner, the temperature sensor that is positioned in front of the heating element is cooled off, and the temperature sensor behind the heating element is heated. The difference between the temperatures (referred to as the differential temperature in the following) is a measure for the flow. The differential temperature is measured and converted into a flow rate with the help of a calibration table. Different embodiments of such thermal flow sensors are known, for example from U.S. Pat. No. 5,936,701 A of Bronkhorst B.V. Company, as well as from EP 1144958 B1 of Sensirion AG Company. The function of such flow sensors will be explained in more detail in the following.

One problem of this thermal measuring principle is that, as the flow increases, not only the temperature profile becomes asymmetrical, but also the heat dissipation through the liquid becomes increasingly relevant. Thus, the differential temperature measured by the temperature sensors rises with increasing flow only in the low flow range. In the case that the flow is higher, the heat output of the heating element is dissipated better and better, so that the temperature of both temperature sensors drops as the flow increases. This effect predominates above a certain flow, so that the difference of the temperatures keeps dropping further. Consequently, the sensor signal increases with the flow rate at a low flow, then goes into saturation, and subsequently drops again if the flow is increased even more. Since thermal flow sensors according to the state of the art analyze the differential temperature, the flow signal that is calculated by the sensor drops as well. This can be avoided within certain limits by taking into account the heat removal when calculating the flow signal. This can for example be effected by changing the reference voltage of the analog to digital converter depending on the average temperature of the two temperature sensors, as described in the patent document U.S. Pat. No. 7,490,511.

Even with this improvement, the dynamic range in which a correct and sufficiently precise flow measurement is possible is limited with thermal flow sensors. What can be reached is a dynamic range of approximately 1:5000, that is, such a thermal flow sensor can measure flows in the range between 1 nL/min to 5000 nL/min, for example.

This is a considerably larger dynamic range than in the flow measurement according to the shunt principle, and it facilitates the manufacture of low flow pumps with an operating range of approximately 1:50, and thus a wider area of application. Another advantage is that the thermal flow sensors cause only a small pressure drop, hence the primary pressures have to be only slightly higher than the system pressure. Depending on the design of the system, it is thus possible to either provide system pressures that are higher as compared to the shunt principle, or one can reach a given system pressure using pump blocks that have a lower pressure rating and are thus cheaper.

However, the flow measurement according to the state of the art has certain disadvantages.

A general disadvantage of the flow measurement according to the state of the art is that the dynamic range is still relatively limited. For this reason, low flow pumps with this technology can only be used in a limited flow range. If the desired flow lies below this range, interfering influences of the sensors, such as noise and drift phenomena, become relevant. This leads to measuring inaccuracies, so that the very high level of reproducibility of the total flow and of the solvent composition, as it is required in chromatography, cannot be reached. In the flow measurement according to the shunt principle, the pressure drop at the fluidic resistance elements that are used for measuring becomes too high at the upper end of the dynamic range, so that the pump can no longer generate a sufficiently high system pressure. When it comes to thermal flow sensors, a correct measurement is only possible up to a certain maximal flow, since the measurement signal goes into saturation.

There have been some attempts to solve these problems.

One attempt makes use of replaceable components.

Since the limited flow range is caused by the design of the flow measurement components, one measure is to accommodate these components inside a replaceable module and to offer different modules that are designed so as to be suitable for different specific flow ranges. If the user wishes to work in another flow range, all they have to do is install the respective module.

As far as the flow measurement according to the shunt principle is concerned, it is even only necessary to replace the (comparatively inexpensive) fluidic resistance elements in order to change the flow range. In this manner, the manufacturer of such a low flow pump can offer multiple replaceable resistance elements, so that the entire flow range of interest can be covered.

As far as the flow measurement with thermal flow sensors is concerned, the sensors themselves have to be exchanged. As the sensors are costly, this is not desirable.

The disadvantage of these simple solutions is that such an exchange of sensitive components by the user involves an increased risk of error. For this purpose, the resistance elements have to be designed in such a manner that an exchange can be performed in a simple and functionally reliable way. This is particularly difficult in the low flow range, since the fluidic connections are especially critical here. For instance, dirt particles can get into the system during the exchange, which may lead to plugging or leaks, for example. Moreover, the exchange is an additional work step for the user, which is desirable to avoid.

Low flow systems with replaceable components that work according to the Shunt principle are available on the market. The system NanoLC 400 by Sciex Company works with replaceable flow modules that contain the resistance elements and are offered for three different flow ranges. In the system RSLCnano, which is offered by the applicant, the resistance elements are also replaceable. In addition to that, in this system it is even possible to replace the entire flow measuring system with a module that works with thermal flow sensors instead of the shunt principle.

A further attempt to overcome the disadvantages employs switchable components.

In order to avoid the problems that are associated with the exchange of components, a manual or automatic switching of the flow ranges is also conceivable. For this purpose, multiple flow measuring systems would have to be present in parallel, the exits of which may be switched either by means of establishing respective capillary connections or by high-pressure switch valves.

However, this would result in a high effort and space requirements for the components.

Another solution relates to a flow sensor with an expandable linear measuring range.

WO 2011/075571 A1 proposes a flow sensor that has an expanded dynamic range (see FIG. 3). The measurement is carried out based on the same principle as in the thermal flow sensors that have already been described above. The capillary (404), through which the flow to be measured flows, is heated by a central heating element (406). Two temperature sensors (402a and 402b) are attached at the capillary in a symmetrical manner with respect to the heating element, determining the temperatures in front and behind the heating element. The difference between these temperatures represents a measure for the flow.

A further temperature sensor (402c) is arranged at the heating element, directly detecting the temperature of the heating element. The temperature of the heating element is controlled to the appropriate value (heater setpoint) via a closed control loop.

In this manner, it is avoided that the temperature of the heating element drops at a high flow. Thus, even at higher flow rates, the differential temperature between the two temperature sensors 402a and 402b keeps rising as the flow rate increases. Such a flow sensor can still provide precise measurements of low as well as relatively high flow rates, and thus has a considerably higher dynamic range than conventional thermal flow sensors. However, in the event of even higher flow rates, the thermal resistance between the heating element and the liquid becomes relevant. In that case, even though the temperature of the heating element remains constant, the temperature of the liquid drops with increasing flow. Within certain limits, this can be counteracted through a higher temperature of the heating element, or/and this effect can be taken into account when converting the differential temperature into the flow.

A more severe problem of this solution is that the controlled heating power, and consequently also the temperature difference to be measured, is the smaller the higher the temperature of the inflowing liquid becomes. This is easy to understand by looking at the extreme case that the temperature of the liquid is equal to the target temperature of the heater, or that it exceeds the same. In that case, the heat output becomes zero, i.e. the measured differential temperature also remains zero independently of the flow rate, so that obviously no flow measurement is possible.

As long as the temperature of the inflowing liquid remains below the target temperature of the heating element, the effect can be compensated including the required heating power in the calculation, for example by multiplying the differential temperature by the inverse of the heating power.

However, this entails the disadvantage that the control loop for the heating power reacts relatively slowly. If there are changes of the flow, it takes some time until the controller is settled and the sensor indicates the flow rate correctly again. Thus, such a sensor detects flow changes only with a certain delay.

If such a slow flow sensor is used in an HPLC pump to control the flow, the flow-control loop must be designed to be very slow as well to avoid instabilities. Such an slow control circuit fails to remove flow deviations fast enough, thus the performance of the entire pump remains suboptimal.

Disregarding these problems, a dynamic range of up to approximately 1:10000 can be achieved with such an improved flow sensor according to the state of the art, corresponding to an operating range of the pump of 1:100. This is considerably better than with conventional thermal flow sensors, but still does not cover the entire low flow range.

In light of the above, it is an object to overcome or at least alleviate the shortcomings and disadvantages of the prior art. More particularly, it is an object of the present invention to provide a technology allowing a measurement of a flow of a fluid over a wide range of fluid flows. The technology should yield accurate and reproducible results, and should be simple and easy to use. According to some embodiments, its accuracy and reproducibility should be sufficient for HPLC usage.

SUMMARY

In a first aspect, the present invention relates to a method for measuring a flow of a fluid in a tube, the method comprising a heating element heating the fluid in the tube; a first temperature sensing element measuring a first signal indicative of a first temperature of the fluid in the tube at a first location; a second temperature sensing element measuring a second signal indicative of a second temperature of the fluid in the tube at a second location, the second location being different from the first location; calculating at least one temperature signal based on the first signal and the second signal; and deriving a flow based on the at least one temperature signal.

It will be understood that the fluid may be a liquid. In simple words, the present invention determines the temperatures (or a signal indicative of the temperature, e.g., a voltage signal) in a tube at different locations. These temperatures are then used for further processing and to arrive at a measure of the flow. This may lead to a stable and easy to use measurement of the flow in the tube.

The step of calculating at least one temperature signal based on the first signal and the second signal may comprise calculating a difference temperature signal based on the difference between the second signal and the first signal.

The step of calculating at least one temperature signal based on the first signal and the second signal may comprise calculating a sum temperature signal based on the sum of the second signal and the first signal.

It will be understood that the at least one temperature signal (as well as the difference temperature signal and/or the sum temperature signal) may be a transformed signal.

In the step of deriving a flow, a flow may be derived based on a first weighted combination of the difference temperature signal and the sum temperature signal when a first condition is met, and a flow may be derived based on a second weighted combination of the difference temperature signal and the sum temperature signal when a second condition is met, wherein the second condition is different from the first condition and wherein the second weighted combination is different from the first weighted combination.

In other words, the present invention may employ a signal based on the difference of the sensed temperatures, i.e., a difference temperature signal, and a signal based on the sum of the sensed temperatures, i.e., a sum temperature signal. These difference temperature signal and sum temperature signal may be used to arrive at a flow through the tube.

It will be understood that the present technology uses the following concept: The heating element heats the fluid, e.g., liquid, in the tube, and raises its temperature. The temperature sensing elements sense temperatures of the liquid. Generally, the closer the temperature sensing elements are to the heating element, the higher the temperature they sense. Furthermore, the temperature they sense also depend on the flow. Generally, the higher the flow, the smaller the temperature they sense. For example, at zero flow, no heat is carried away by the flow, which is why the temperature sensed by the temperature sensing element is at its maximum. The higher the flow, the more heat is carried away by the flow, and the lower the temperature. This general rationale is applicable for both temperature sensing elements, which is why the sum temperature may be used to determine the flow in the tube.

Furthermore, it will also be understood that the temperatures sensed by the temperature sensing elements are different. Consider the case that the temperature sensing elements are arranged symmetrical with respect to the heating element, i.e., one is located upstream of the heating element and the other is located downstream of the heating element at the same distance to the heating element. When the heating element heats the fluid, the heat introduced into the fluid will lead to a greater temperature increase in the downstream temperature sensing element than in the upstream temperature sensing element.

Thus, the differential temperature may be a measure to determine the flow.

The present technology may employ both the sum temperature signal and the difference temperature signal to arrive at the flow in the tube. More particularly, it may assign weights (e.g., in the range of 0 to 1, and such that the sum of both weights equals 1) to each of them and determine the flow based on these weights, wherein the weights depend on certain conditions.

This may result in a particularly stable and fail safe determination of the flow based on the measured temperatures.

In the above, it has been described that weights are assigned to the sum temperature signal and to the difference temperature signal. The skilled person will understand that in embodiments where the sum temperature signal and the difference temperature signal are transformed and/or linearized, the assigning of the weights may be performed at any step. That is, it may be possible to first assign the weights and then transform and/or linearize the signals. Conversely, it is also possible to first transform and/or linearize the signals and then assign weights to them.

In the step of deriving a flow, a flow may be derived based on the difference temperature signal when the first condition is met; and a flow may be derived based on the sum temperature signal when the second condition is met.

In other words, in this embodiment, the first weighted combination corresponds to weighting the difference temperature signal with a weighting factor of 1 and the sum temperature signal with a weighting factor of 0; and the second weighted combination corresponds to weighting the sum temperature signal with a weighting factor of 1 and the difference temperature sensor with a weighting factor of 0. This may be a particularly simple embodiment, as it simply employs the sum temperature signal in certain regions and the difference temperature signal in other regions.

The tube may be a capillary.

The second location may be distanced from the heating element in a direction opposite to the first location. In other words, one of the temperature sensing elements may be positioned "upstream" of the heating element and the other one may be positioned "downstream" of the heating element.

In other words, the first and second locations may be on opposite sides of the heating element.

The step of calculating at least one temperature signal and the step of deriving a flow may be performed by a data processing apparatus.

The method may further comprise automatic switching between deriving the flow based on different weighted combinations of the difference temperature signal and the sum temperature signal.

That means, this switching is done by means of a system where the method is carried out, without a user having to interact with the system.

The difference temperature signal and the sum temperature signal may be acquired simultaneously or quasi-simultaneously.

Quasi-simultaneous acquisition means that both signals are repeatedly and successively acquired. E.g., the system performing the method switches between acquiring the difference temperature signal and acquiring the sum temperature signal in time intervals in the range of 0.1 ms to 1000 ms, preferably 1 ms to 500 ms.

Acquiring these signals simultaneously or quasi-simultaneously may be particularly beneficial as it is thus possible to switch relatively rapidly between the different modes (or the different weights), thereby improving the accuracy of the method.

The first condition and the second condition may depend on the sum temperature signal.

That is, the sum temperature signal may be used to determine which measure (and to which extent) form(s) the basis for calculating the flow.

Consider, e.g., a very low flow. In such a case, the sum temperature signal will be close to its maximum and will therefore have a relatively flat slope. That is, an increase of the flow will only have a small impact on the sum temperature signal.

That is, the sum temperature signal will not be highly indicative of a change of the flow in this region.

On the other hand, the difference temperature signal has a very steep slope at flows close to zero. That is, the temperature difference at the temperature sensing elements will be a good measure to determine the flow when the flows are small. That is, one may assign a great weight to the difference temperature signal at such small flows.

However, as the method is used to determine the flow, one does not precisely know the flow at the beginning of operating the method, and one may need a measure to determine which temperature signal(s) (sum temperature signal and difference temperature signal) is/are used for determining the flow and to what extent, i.e., with which weighting factor. The sum temperature signal may be a measure for determining that. As discussed, the sum temperature signal is usually smaller the greater the (absolute value of the) flow. That is, it may be used as an approximate measure for the flow to thereby determine which temperature signal(s) is/are used and to which extent.

A sum temperature weight may be assigned to the sum temperature signal and a difference temperature weight may be assigned to the difference temperature signal, wherein the sum of these weights equals 1, and wherein the flow is derived based on these weights. Said weights may depend on the sum temperature signal or on the difference temperature signal.

When the sum temperature is above a turning point threshold, the difference temperature weight may be at least 0.7, preferably at least 0.9.

This follows the above described rationale: when the sum temperature is relatively great, i.e., relatively close to its maximum, the sum temperature signal may not be very indicative of the flow, as in this region changes in the flow only have a small impact on the sum temperature. On the other hand, the difference temperature may have a very steep slope in this region. Thus, it may be advantageous to assign a great weight to the difference temperature signal in this region and only a small weight to the sum temperature signal.

When the sum temperature signal is in the range between a first steep threshold and a second steep threshold, the sum temperature weight may be at least 0.7, preferably at least 0.9.

This region may denote a region where there is a relatively steep slope in the relationship between the flow and the sum temperature signal. The sum temperature signal is thus highly indicative of a change in the flow in this region, which is why it may be advantageous to assign a high weight to this signal in this region.

When the sum temperature signal is below a flat threshold, the difference temperature weight may be at least 0.7, preferably at least 0.9.

This is based on the following rationale: When considering very large flows, the sum temperature becomes increasingly flat. At very large flows, the heat is carried away by the flow very quickly, which is the reason why the sum temperature signal becomes increasingly flat. This is only partially true for the difference temperature signal, as here the above described effect of the overall heat being carried away from the temperature sensing elements plays a role, but also the effect of the heat being carried away asymmetrically has an impact, and both effects increase with increasing flow. This is why for very large flows, corresponding to sum temperatures below a certain threshold, it may again be advantageous to assign a high weight to the difference temperature.

It should be noted that the above names of the thresholds (e.g., turning point threshold, first and second steep thresholds, and flat threshold) are just to be able to better differentiate them. In particular, the provided names should not limit their scope. The thresholds may also be referred to as first threshold (=turning point threshold), second threshold (=first steep threshold), third threshold (=second steep threshold), and fourth threshold (=flat threshold).

The basic rationale for the names of the threshold is the curve where the sum temperature signal is plotted against the flow. It will be understood that this curve has a maximum at flow=0 (as there is no heat carried away by the flow of the fluid) and then declines asymptotically to a minimum as the flow is increased (as more and more heat is carried away by the flow). That is, this curve has a maximum turning point at flow=0.

The turning point threshold is the threshold closest to this turning point, i.e., it is the threshold having the highest sum temperature signal. Above this point, the described curve is relatively flat, which is why it is preferred that only the difference temperature signal is used for deriving the flow above this threshold.

As the described curve asymptotically approaches at high flow rates a minimum as the flow is increased, it will be understood that the curve becomes increasingly flat when the flow is increased. This is the basis for the "flat threshold". When the sum temperature signal is below such a flat threshold, the described curve is relatively flat, i.e., the sum temperature only changes marginally with the flow. This is why below the flat threshold, it is preferred to make use of the difference temperature signal.

Again referring to the described curve (flow vs. sum temperature signal), it will further be understood that in a section between flow=0 (where the curve has a maximum turning point) and very high flows (where the curve becomes flat), there is a relatively steep section. This steep section can be used to derive the flow based on the sum temperature signal. This section may be defined by the described first and second steep thresholds.

It will be understood that generally, of the four described thresholds, the flat threshold will be the smallest one (i.e., having the smallest sum temperature signal) followed by the first steep threshold, the second steep threshold and the turning point threshold.

When the sum temperature signal is between the second steep threshold and the turning point threshold, the difference temperature weight may be greater the closer the sum temperature signal is to the turning point threshold and the sum temperature weight may be greater the closer the sum temperature signal is to the second steep threshold.

When the sum temperature signal is between the flat threshold and the first steep threshold, the difference temperature weight may be greater the closer the sum temperature signal is to the flat threshold and the sum temperature signal may be greater the closer the sum temperature signal is to the first steep threshold.

Again, assigning such weights may be advantageous as it may yield better results.

The function defined by the relationship of the difference temperature weight to the sum temperature signal may be a smooth (i.e. continuous) function, and preferably a continuously differentiable function.

When the sum temperature signal is above a turning point threshold, the flow may be derived based on the difference temperature signal.

This (and also the features discussed below) follows the rationale discussed above. However, in the embodiments discussed here, the flow may be derived based completely on the difference temperature signal (or the sum temperature signal), depending on the region.

This may be a particularly simple manner to arrive at a measure for the flow.

When the sum temperature signal is in the range between a first steep threshold and a second steep threshold, the flow may be derived based on the sum temperature signal.

When the sum temperature signal is below a flat threshold, the flow may be derived based on the difference temperature signal.

In the range between the second steep threshold and the turning point threshold, there may be a linear relationship between the weights and the sum temperature signal.

In the range between the second steep threshold and the turning point threshold, the weights may satisfy:

$$\text{difference temperature weight} = \frac{\text{sum temperature signal} - \text{second steep threshold}}{\text{turning point threshold} - \text{second steep threshold}}; \text{ and}$$

$$\text{sum temperature weight} = 1 - \text{difference temperature weight}.$$

Alternatively, in the range between the second steep threshold and the turning point threshold, there may also be a non-linear relationship between the weights and the sum temperature signal.

In the range between the flat threshold and the first steep threshold, there may be a linear relationship between the weights and the sum temperature signal.

In the range between the flat threshold and the first steep threshold, the weights may satisfy:

$$\text{sum temperature weight} = \frac{\text{sum temperature signal} - \text{flat threshold}}{\text{first steep threshold} - \text{flat threshold}}; \text{ and}$$

$$\text{difference temperature weight} = 1 - \text{sum temperature weight}.$$

Alternatively, in the range between the flat threshold and the first steep threshold, there may be a non-linear relationship between the weights and the sum temperature signal.

The method may further comprise linearizing a relationship between the flow and the difference temperature signal; and linearizing a relationship between the flow and the sum temperature signal.

In the step of linearizing a relationship between the flow and the sum temperature signal, the difference temperature signal may be taken into consideration.

It will be understood that the sum temperature signal is not indicative of the direction of the flow. That is, two flows having the same strength but opposite flow directions may result in the same sum temperature signal. To also indicate the flow direction, the difference temperature signal may also be taken into account.

The relationship between the flow and the sum temperature signal may only be linearized in the sum temperature range from the flat threshold to the turning point threshold.

This may render the method particularly simple and efficient.

The relationship between the flow and the difference temperature signal may only be linearized in the sum temperature ranges below the first steep threshold and above the second steep threshold.

The method may be performed in a flow measuring system and the method may further comprise controlling a temperature of the flow measuring system.

In some embodiments, this may include controlling a reference temperature of the first temperature sensing element and the second temperature sensing element.

Such a control of the reference temperature of the temperature sensing elements may be advantageous for different reasons.

In particular, the temperature sensing elements may be realized as thermal elements, also referred to as thermocouples. They may measure the temperature of the fluid by comparing it to the reference temperature. It will be understood that a change of the reference temperature of the temperature sensing element will directly change the output signal of such a sensor. Provided that the reference temperatures of both temperature sensing elements are equal, this does not change the difference temperature, but will directly alter the measured sum temperature signal and thus flow signal of the flow measuring system.

Alternatively, the temperature sensing elements may be realized as temperature dependent resistive elements such as NTC (Negative Temperature Coefficient) resistors or Pt100 (platinium) temperature sensors. It will be understood that a change of the flow measuring system will change the overall temperature of its internal components and thus again alter the measured sum temperature.

The above recited feature accounts for that by controlling a temperature of the flow measuring system, may lead to a higher accuracy, and an overall better performance, of the described method.

The method may further comprise controlling the temperature of the fluid before the fluid enters the tube.

It will be understood that the sum temperature signal depends on the heating due to the heating element and the flow. However, it will also be understood that this signal also depends on the overall temperature of the fluid in the tube, or, put differently, on the temperature the fluid has when entering the tube. The higher this temperature, the higher the sum temperature signal.

If not controlling the fluid temperature when entering the tube, this may result in an error of the described method. It may therefore be particularly advantageous to also control the temperature of the fluid to arrive at more reliable results for the flow measurement.

The temperature of the flow measuring system and the temperature of the fluid before it enters the tube may be controlled to be equal to each other. This may allow for a particularly stable and advantageous setting of the temperatures and therefore in a particularly robust measurement of the flow.

The present invention also relates to a flow measuring system for measuring a flow of a fluid in a tube, the system comprising a tube; a heating element configured to heat the fluid in the tube; a first temperature sensing element configured and located to measure a first signal indicative of a first temperature of the fluid in the tube at a first location; and a second temperature sensing element configured and located to measure a second signal indicative of a second temperature of the fluid in the tube at a second location, the second location being different from the first location.

It will be understood that this system may have advantages corresponding to the advantages discussed above in conjunction with the method.

The flow measuring system may further comprise a data processing apparatus, wherein the data processing apparatus is configured to calculate at least one temperature signal based on the first and the second signal and to derive a flow based on the at least one temperature signal.

The data processing apparatus may further be configured to carry out the steps recited above with regard to the discussed method.

The flow measuring system may further comprise at least one temperature control element adapted to control a temperature of the flow measuring system.

Again, this may have advantages as discussed above with respect to the temperature control of the flow measuring system.

The at least one temperature control element may comprise a heating device or a peltier element.

The system may further comprise a heat transfer element configured and located to conduct heat between the at least one temperature control element and other components of the flow measuring system.

In embodiments where the temperature sensing elements include reference temperature sections, the heat transfer element may also be configured and located to conduct heat to and from the reference temperature sections of the temperature sensing elements.

The heat transfer element may be formed of a material having a thermal conductivity of at least 10 W/(m·K), preferably at least 50 W/(m·K), further preferably at least 100 W/(m·K), such as at least 200 W/(m·K).

The heat transfer element may be formed of metal, such as aluminium.

The tube may be a capillary, such as a metal capillary or fused silica capillary.

The capillary may have an inner diameter of 1 μm to 1500 μm, preferably 10 μm to 1000 μm, further preferably 15 μm to 500 μm.

The system may further comprise a fluid temperature control element configured to control a temperature of the fluid.

It will be understood that the fluid temperature control element may be a part of the at least one temperature control element. However, in some embodiments, it may also be a distinct part separate from the discussed at least one temperature control element.

The fluid temperature control element may comprise an eluent preheater.

The fluid temperature control element may comprise a housing and a fluid conducting pathway in the housing.

The fluid conducting pathway may have a length of 5 cm to 50 cm, preferably 10 cm to 30 cm, further preferably 15 cm to 25 cm, such as 20 cm.

The heat transfer element may further be configured and located to conduct heat between the at least one temperature control element and the fluid temperature control element.

The system may further comprise a temperature sensor configured and located to sense a temperature of the heat transfer element.

The flow measuring system may further comprise a housing enclosing the remainder of the system.

Further, such a housing may insulate the system from the outside and therefore also contribute to the temperature control of the system.

The housing may be formed of a material having a thermal conductivity below 10 W/(m·K), preferably below 5 W/(m·K), further preferably below 1 W/(m·K).

The system may comprise a housing tempering system for adjusting the temperature of the housing.

In such an embodiment, it may be possible that the housing is formed of a material having a relatively high thermal conductivity, such as at least 10 W/(m·K), preferably at least 50 W/(m·K), further preferably at least 100 W/(m·K), such as at least 200 W/(m·K).

The first and second temperature sensing elements may be arranged symmetrically with respect to the heating element.

The temperature sensing elements may be thermal elements.

The present invention also relates to a pump system comprising at least one pump; at least one flow measuring system as discussed above system embodiments; and a pump control unit configured to receive a signal indicative of the flow by the at least one flow measuring system; and adjust a setting of the at least one pump.

Again, this may result in advantages corresponding to the one discussed above with regard to the flow measuring system.

The system may comprise a plurality of pumps; a plurality of flow measuring systems according to any of the preceding system embodiments; and a pump control unit configured to receive signals indicative of the flows by the plurality of flow measuring systems; and adjust settings of the plurality of pumps.

The pump system may further comprise at least one solvent supply per pump.

The pump system may further comprise a pressure sensor per pump.

The pump system may further comprise a system pressure sensor.

The pump system may further comprise a mixer for mixing flows generated by the plurality of pumps.

Each flow measuring system may be located between a pump and the mixer.

The method discussed above may use the system as discussed above or the pump system as discussed above.

The present invention also relates to a use as discussed above, the system as discussed above, or the pump system as discussed above, for liquid chromatography.

The use may be for high performance liquid chromatography.

The use may comprise supplying the fluid to a pressure of at least 100 bar, preferably at least 500, further preferably at least 1,000 bar, such as at least 1,500 bar.

The use may comprise measuring a flow in the range of 1 nL/min to 10 nL/min.

The use may comprise measuring a flow in the range of 10 nL/min to 100 nL/min.

The use may comprise measuring a flow in the range of 1 μL/min to 10 μL/min.

The use may comprise measuring a flow in the range of 10 μL/min to 100 μL/min.

In particular, the use may also comprise all of the above ranges. That is, the present invention may enable the user to measure flows in all of the above ranges with a single method and a single device.

That is, the invention also concerns pumps that can generate such low flow rates with a high precision and reproducibility. It is possible to measure and regulate the generated flow by means of flow sensors. It will also be understood that the invention also relates to flow sensors that are suitable for this purpose and that cover the entire low flow range. While the present invention is described with particular reference to LC and HPLC, it should also be understood that the described technology and the described flow sensors may also be of interest for other technical fields in which low liquid volume flows have to be measured with high precision.

It is generally noted that the described technology may be applicable to the field of HPLC. Pumps for HPLC are supposed to be applicable universally for different chromatography columns. Ideally, a pump low-flow HPLC range should cover the entire flow range from just a few nL/min up to approximately 100 μL/min. Due to the special characteristics in the low flow range, it is desirable to have flow sensors that cover a dynamic range of approximately 1:100000. This dynamic range cannot be reached with flow sensors according to the current state of the art. The present invention may provide a solution by means of which a fast and exact flow measurement and flow control is possible in the entire low flow range with the precision and reproducibility that is required in chromatography. The presently described solution is cost-effective and user-friendly, and may cover the identified flow rate range, without the need to exchange components or to switch between different components.

Generally speaking, the described technology is based on the fact that the thermal flow sensors can provide signals that can be analyzed in the entire low flow range of interest and are dependent on the flow. According to the described technology, these signals are utilized in order to create a new thermal flow sensor that may facilitate an exact flow measurement in the entire low flow range including nano HPLC, capillary HPLC, and micro HPLC. This new thermal flow sensor may contain additional components, whereby the precision in the analysis of the sum temperature is improved in such a manner that it is sufficient for HPLC applications. Further, the sum temperature and the differential temperature are read at the same time or in an alternating manner and combined into a single signal, so that a continuous measuring range without any discontinuities is created.

The measurement signal of such a flow sensor according to embodiments of the invention can be used for controlling the flow provided by a pump block to a reference value by means of a closed control circuit, so that exactly the desired flow is provided.

The combination of two or more such pump blocks including the flow sensors and control circuits according to the invention results in a gradient pump that can be used in the entire low flow range. Such a gradient pump can mix two or more solvents with a settable mixing ratio, and thus create solvent gradients for HPLC applications.

Due to the large flow range of the flow sensors according to embodiments of the invention, such an HPLC pump is suitable for a broader range of different HPLC applications, wherein the flow and the desired solvent composition are maintained with high precision in the entire range.

The present invention also relates to the following numbered embodiments.

Below, method embodiments will be discussed. Those embodiments are abbreviated with the letter "M" followed by a number. Whenever reference is herein made to method embodiments, these embodiments are meant.

M1. A method for measuring a flow of a fluid in a tube, the method comprising
 a heating element heating the fluid in the tube;
 a first temperature sensing element measuring a first signal indicative of a first temperature of the fluid in the tube at a first location;

a second temperature sensing element measuring a second signal indicative of a second temperature of the fluid in the tube at a second location, the second location being different from the first location;

calculating at least one temperature signal based on the first signal and the second signal;

deriving a flow based on the at least one temperature signal.

M2. The method according to the preceding embodiment, wherein calculating at least one temperature signal based on the first signal and the second signal comprises calculating a difference temperature signal based on the difference between the second signal and the first signal.

M3. The method according to any of the preceding embodiments, wherein calculating at least one temperature signal based on the first signal and the second signal comprises calculating a sum temperature signal based on the sum of the second signal and the first signal.

M4. The method according to embodiment M3 with the features of M2, wherein in the step of deriving a flow, a flow is derived based on a first weighted combination of the difference temperature signal and the sum temperature signal when a first condition is met; and a flow is derived based on a second weighted combination of the difference temperature signal and the sum temperature signal when a second condition is met;

wherein the second condition is different from the first condition and wherein the second weighted combination is different from the first weighted combination.

M5. The method according to the preceding embodiment, wherein in the step of deriving a flow, a flow is derived based on the difference temperature signal when the first condition is met; and a flow is derived based on the sum temperature signal when the second condition is met.

In other words, in this embodiment, the first weighted combination corresponds to weighting the difference temperature signal with a weighting factor of 1 and the sum temperature signal with a weighting factor of 0; and the second weighted combination corresponds to weighting the sum temperature signal with a weighting factor of 1 and the difference temperature sensor with a weighting factor of 0.

M6. The method according to any of the preceding embodiments, wherein the tube is a capillary.

M7. The method according to any of the preceding embodiments, wherein the second location is distanced from the heating element in a direction opposite to the first location.

In other words, the first and second locations may be on opposite sides of the heating element.

M8. The method according to any of the preceding embodiments, wherein the step of calculating at least one temperature signal and the step of deriving a flow are performed by a data processing apparatus.

M9. The method according to any of the preceding embodiments with the features of embodiment M4, wherein the method further comprises automatic switching between deriving the flow based on different weighted combinations of the difference temperature signal and the sum temperature signal.

That means, this switching is done by means of a system where the method is carried out, without a user having to interact with the system.

M10. The method according to any of the preceding embodiments with the features of embodiment M4, wherein the difference temperature signal and the sum temperature signal are acquired simultaneously or quasi-simultaneously.

Quasi-simultaneous acquisition means that both acquisitions are repeatedly and successively performed. E.g., the system performing the method switches between acquiring the difference temperature signal and acquiring the sum temperature signal in time intervals in the range of 0.1 ms to 1000 ms, preferably 1 ms to 500 ms.

M11. The method according to any of the preceding embodiments with the features of embodiment M4, wherein the first condition and the second condition depend on the sum temperature signal.

M12. The method according to any of the preceding embodiments with the features of embodiment M4, wherein a sum temperature weight is assigned to the sum temperature signal and a difference temperature weight is assigned to the difference temperature signal, and wherein the sum of these weights equals 1, and wherein the flow is derived based on these weights.

M13. The method according to the preceding embodiment, wherein when the sum temperature is above a turning point threshold, the difference temperature weight is at least 0.7, preferably at least 0.9.

M14. The method according any of the preceding embodiments with the features of embodiment M12, wherein when the sum temperature signal is in the range between a first steep threshold and a second steep threshold, the sum temperature weight is at least 0.7, preferably at least 0.9.

M15. The method according to any of the preceding embodiments with the features of embodiment M12, wherein when the sum temperature signal is below a flat threshold, the difference temperature weight is at least 0.7, preferably at least 0.9.

It should be noted that the above names of the thresholds (e.g., turning point threshold, first and second steep thresholds, and flat threshold) are just to be able to better differentiate them. In particular, the provided names should not limit their scope. The thresholds may also be referred to as first threshold (=turning point threshold), second threshold (=first steep threshold), third threshold (=second steep threshold), and fourth threshold (=flat threshold).

The basic rationale for the names of the threshold is the curve where the sum temperature signal is plotted against the flow. It will be understood that this curve has a maximum at flow=0 (as there is now heat carried away by the flow of the fluid) and then declines asymptotically to a minimum as the flow is increased (as more and more heat is carried away by the flow). That is, this curve has a maximum turning point at flow=0.

The turning point threshold is the threshold closest to this turning point, i.e., it is the threshold having the highest sum temperature signal. Above this point, the described curve is relatively flat, which is why it is preferred that only the difference temperature signal is used for deriving the flow above this threshold.

As the described curve asymptotically approaches a minimum as the flow is increased, it will be understood that the curve becomes increasingly flat when the flow is increased. This is the basis for the "flat threshold". When the sum temperature signal is below such a flat threshold, the described curve is relatively flat, i.e., the sum temperature only changes marginally with the flow. This is why below the flat threshold, it is preferred to make use of the difference temperature signal. It will be understood that this may also depend on the characteristics of the sensor and the solvent used. In some embodiments, also the sum temperature signal may be usable for high flow rates.

Again referring to the described curve (flow vs. sum temperature signal), it will further be understood that in a section between flow=0 (where the curve has a maximum turning point) and very high flows (where the curve becomes flat), there is a relatively steep section. This steep section can be used to derive the flow based on the sum temperature signal. This section may be defined by the described first and second steep thresholds.

It will be understood that generally, of the four described thresholds, the flat threshold will be the smallest one (i.e., having the smallest sum temperature signal) followed by the first steep threshold, the second steep threshold and the turning point threshold.

M16. The method according to any of the preceding embodiments with the features of embodiments M13 and M14, wherein when the sum temperature signal is between the second steep threshold and the turning point threshold, the difference temperature weight is greater the closer the sum temperature signal is to the turning point threshold and the sum temperature weight is greater the closer the sum temperature signal is to the second steep threshold.

M17. The method according to any of the preceding embodiments with the features of embodiments M14 and M15, wherein when the sum temperature signal is between the flat threshold and the first steep threshold, the difference temperature weight is greater the closer the sum temperature signal is to the flat threshold and the sum temperature signal is greater the closer the sum temperature signal is to the first steep threshold.

M18. The method according to any of the preceding embodiments with the features of embodiment M12, wherein the function defined by the relationship of the difference temperature weight to the sum temperature signal is a smooth function, preferably a continuously differentiable function.

M19. The method according to any of the preceding embodiments with the features of embodiment M5, wherein when the sum temperature signal is above a turning point threshold, the flow is derived based on the difference temperature signal.

M20. The method according to any of the preceding embodiments with the features of embodiment M5, wherein when the sum temperature signal is in the range between a first steep threshold and a second steep threshold, the flow is derived based on the sum temperature signal.

M21. The method according to any of the preceding embodiments with the features of embodiment M5, wherein when the sum temperature signal is below a flat threshold, the flow is derived based on the difference temperature signal.

M22. The method according to any of the preceding embodiments and with the features of embodiments M12, M19 and M20, wherein in the range between the second steep threshold and the turning point threshold, there is a linear relationship between the weights and the sum temperature signal.

M23. The method according to the preceding embodiment, wherein in the range between the second steep threshold and the turning point threshold, the weights satisfy:

$$\text{difference temperature weight} = \frac{\text{sum temperature signal} - \text{second steep threshold}}{\text{turning point threshold} - \text{second steep threshold}}; \text{ and}$$

$$\text{sum temperature weight} = 1 - \text{difference temperature weight}.$$

M24. The method according to any of the preceding embodiments M1 to M21 and with the features of embodiment M12, M19 and M20, wherein in the range between the second steep threshold and the turning point threshold, there is a non-linear relationship between the weights and the sum temperature signal.

M25. The method according to any of the preceding embodiments with the features of embodiment M12, M20 and M21, wherein in the range between the flat threshold and the first steep threshold, there is a linear relationship between the weights and the sum temperature signal.

M26. The method according to the preceding embodiment, wherein in the range between the flat threshold and the first steep threshold, the weights satisfy:

$$\text{sum temperature weight} = \frac{\text{sum temperature signal} - \text{flat threshold}}{\text{first steep threshold} - \text{flat threshold}}; \text{ and}$$

$$\text{difference temperature weight} = 1 - \text{sum temperature weight}.$$

M27. The method according to any of the preceding embodiments M1 to M24 with the features of embodiment M12, M20 and M21, wherein in the range between the flat threshold and the first steep threshold, there is a non-linear relationship between the weights and the sum temperature signal.

M28. The method according to any of the preceding embodiments with the features of embodiment M4, wherein the method further comprises linearizing a relationship between the flow and the difference temperature signal; and
linearizing a relationship between the flow and the sum temperature signal.

M29. The method according to the preceding embodiment, wherein in the step of linearizing a relationship between the flow and the sum temperature signal, the difference temperature signal is taken into consideration.

It will be understood that the sum temperature signal is not indicative of the direction of the flow. That is, two flows having the same strength but opposite flow directions may result in the same sum temperature signal. To also indicate the flow direction, the difference temperature signal may also be taken into account.

M30. The method according to any of the 2 preceding embodiments and with the features of embodiments M13 and M15, wherein the relationship between the flow and the sum temperature signal is only linearized in the sum temperature range from the flat threshold to the turning point threshold.

M31. The method according to any of the 3 preceding embodiments and with the features of embodiment M15, wherein the relationship between the flow and the difference temperature signal is only linearized in the sum temperature ranges below the first steep threshold and above the second steep threshold.

M32. The method according to any of the preceding embodiments and with the features of embodiment M12, wherein said weights depend on the sum temperature signal.

M33. The method according to any of the embodiments M1 to M32 and with the features of embodiments M12, wherein said weights depend on the difference temperature signal.

M34. The method according to any of the preceding embodiments, wherein the method is performed in a flow measuring system, and wherein the method further comprises controlling a temperature of the flow measuring system.

M35. The method according to any of the preceding embodiments, wherein the method further comprises controlling the temperature of the fluid before the fluid enters the tube.

M36. The method according to the preceding embodiment when dependent on the penultimate embodiment, wherein the temperature of flow measuring system and the temperature of the fluid before it enters the tube are controlled to be equal to each other.

Below, system embodiments will be discussed. Those embodiments are abbreviated with the letter "S" followed by a number. Whenever reference is herein made to system embodiments, these embodiments are meant.

S1. A flow measuring system for measuring a flow of a fluid in a tube, the system comprising
  a tube;
  a heating element configured to heat the fluid in the tube;
  a first temperature sensing element configured and located to measure a first signal indicative of a first temperature of the fluid in the tube at a first location;
  a second temperature sensing element configured and located to measure a second signal indicative of a second temperature of the fluid in the tube at a second location, the second location being different from the first location.

S2. The flow measuring system according to the preceding embodiment and further comprising
  a data processing apparatus, wherein the data processing apparatus is configured
    to calculate at least one temperature signal based on the first and the second signal and
    to derive a flow based on the at least one temperature signal.

S3. The flow measuring system according to the preceding embodiment, wherein the data processing apparatus is further configured to carry out the steps recited in any one of embodiments M2 to M5, M9 to M33.

S4. The flow measuring system according to any of the preceding system embodiments, wherein the system further comprises
  at least one temperature control element configured to control a temperature of the flow measuring system.

S5. The flow measuring system according to the preceding embodiment, wherein the at least one temperature control element comprises a heating device or a peltier element.

S7. The flow measuring system according to any of the embodiments S4 and S5, wherein the system further comprises a heat transfer element configured and located to conduct heat between the at least one temperature control element and other components of the flow measuring system.

S8. The flow measuring system according to the preceding embodiment, wherein the heat transfer element is formed of a material having a thermal conductivity of at least 10 W/(m·K), preferably at least 50 W/(m·K), further preferably at least 100 W/(m·K), such as at least 200 W/(m·K).

S19. The flow measuring system according to any of the preceding two embodiments, wherein the heat transfer element is formed of metal, such as aluminium.

S10. The flow measuring system according to any of the preceding system embodiments, wherein the tube is a capillary, and preferably comprises metal or fused silica.

S11. The flow measuring system according to any of the preceding system embodiments, wherein the capillary has an inner diameter of 5 μm to 1500 μm, preferably 10 μm to 1000 μm, further preferably 15 μm to 500 μm.

S12. The flow measuring system according to any of the preceding system embodiments, wherein the system further comprises
  a fluid temperature control element configured to control a temperature of the fluid.

S13. The flow measuring system according to the preceding embodiment, wherein the fluid temperature control element comprises an eluent preheater.

S14. The flow measuring system according to any of the preceding 2 embodiments, wherein the fluid temperature control element comprises a housing and a fluid conducting pathway in the housing.

S15. The flow measuring system according to the preceding embodiment, wherein the fluid conducting pathway has a length of 5 cm to 50 cm, preferably 10 cm to 30 cm, further preferably 15 cm to 25 cm, such as 20 cm.

S16. The flow measuring system according to any of the preceding system embodiments with the features of embodiments S7 and S12, wherein the heat transfer element is further configured and located to conduct heat between the at least one temperature control element and the fluid temperature control element.

S17. The flow measuring system according to any of the preceding system embodiments and with the features of embodiment S7, wherein the system further comprises a temperature sensor configured and located to sense a temperature of the heat transfer element.

S18. The flow measuring system according to any of the preceding system embodiments and further comprising a housing enclosing the remainder of the system.

S19. The flow measuring system according to the preceding embodiment, wherein the housing is formed of a material having a thermal conductivity below 10 W/(m·K), preferably below 5 W/(m·K), further preferably below 1 W/(m·K).

S20. The flow measuring system according to the penultimate embodiments, wherein the system comprises a housing tempering system for adjusting the temperature of the housing.

S21. The flow measuring system according to the preceding embodiments, wherein the housing is formed of a material having a thermal conductivity of at least 10 W/(m·K), preferably at least 50 W/(m·K), further preferably at least 100 W/(m·K), such as at least 200 W/(m·K)

S22. The flow measuring system according to any of the preceding system embodiments, wherein the first and second temperature sensing elements are arranged symmetrically with respect to the heating element.

S23. The flow measuring system according to any of the preceding system embodiments, wherein the temperature sensing elements are thermal elements.

Below, pump embodiments will be discussed. Those embodiments are abbreviated with the letter "P" followed by a number. Whenever reference is herein made to pump embodiments, these embodiments are meant.

P1. A pump system comprising
   at least one pump;
   at least one flow measuring system according to any of the preceding system embodiments; and
   a pump control unit configured to
      receive a signal indicative of the flow by the at least one flow measuring system; and
      adjust a setting of the at least one pump.

P2. The pump system according to the preceding embodiment, wherein the system comprises
   a plurality of pumps;
   a plurality of flow measuring systems according to any of the preceding system embodiments; and
   a pump control unit configured to
      receive signals indicative of the flows by the plurality of flow measuring systems;
      adjust settings of the plurality of pumps.

P3. The pump system according to any of the preceding pump embodiments further comprising at least one solvent supply per pump.

P4. The pump system according to any of the preceding pump embodiments further comprising a pressure sensor per pump.

P5. The pump system according to any of the preceding pump embodiments further comprising a system pressure sensor.

P6. The pump system according to any of the preceding pump embodiments with the features of embodiment P2 further comprising a mixer for mixing flows generated by the plurality of pumps.

P7. The pump system according to the preceding embodiment, wherein each flow measuring system is located between a pump and the mixer.

M37. The method according to any of the preceding method embodiment, wherein the method uses the system according to any of the preceding system embodiments or the pump system according to any of the preceding pump embodiments.

Below, use embodiments will be discussed. Those embodiments are abbreviated with the letter "U" followed by a number. Whenever reference is herein made to use embodiments, these embodiments are meant.

U1. Use of the method according to any of the preceding method embodiments, the system according to any of the preceding system embodiments or the pump system according to any of the preceding pump embodiments for liquid chromatography.

U2. Use according to the preceding embodiment, wherein the use is for high performance liquid chromatography.

U3. Use according to the preceding use embodiments, wherein the use comprises supplying the fluid to a pressure of at least 100 bar, preferably at least 500, further preferably at least 1.000 bar, such as at least 1.500 bar.

U4. Use according to any of the preceding use embodiments, wherein the use comprises measuring a flow in the range of 1 nL/min to 10 nL/min.

U5. Use according to any of the preceding use embodiments, wherein the use comprises measuring a flow in the range of 10 nL/min to 100 nL/min.

U6. Use according to any of the preceding use embodiments, wherein the use comprises measuring a flow in the range of 1 µL/min to 10 µL/min.

U7. Use according to any of the preceding use embodiments, wherein the use comprises measuring a flow in the range of 10 µL/min to 100 µL/min.

In particular, the use may also comprise all of the above ranges. That is, the present invention may enable the user to measure flows in all of the above ranges with a single method and a single device.

BRIEF DESCRIPTION OF THE DRAWINGS

Embodiments of the present invention will now be described with reference to the accompanying drawings. It should be understood that these embodiments are meant to exemplify, and not to limit, the scope of the present invention.

DETAILED DESCRIPTION OF EMBODIMENTS

Figure 1:
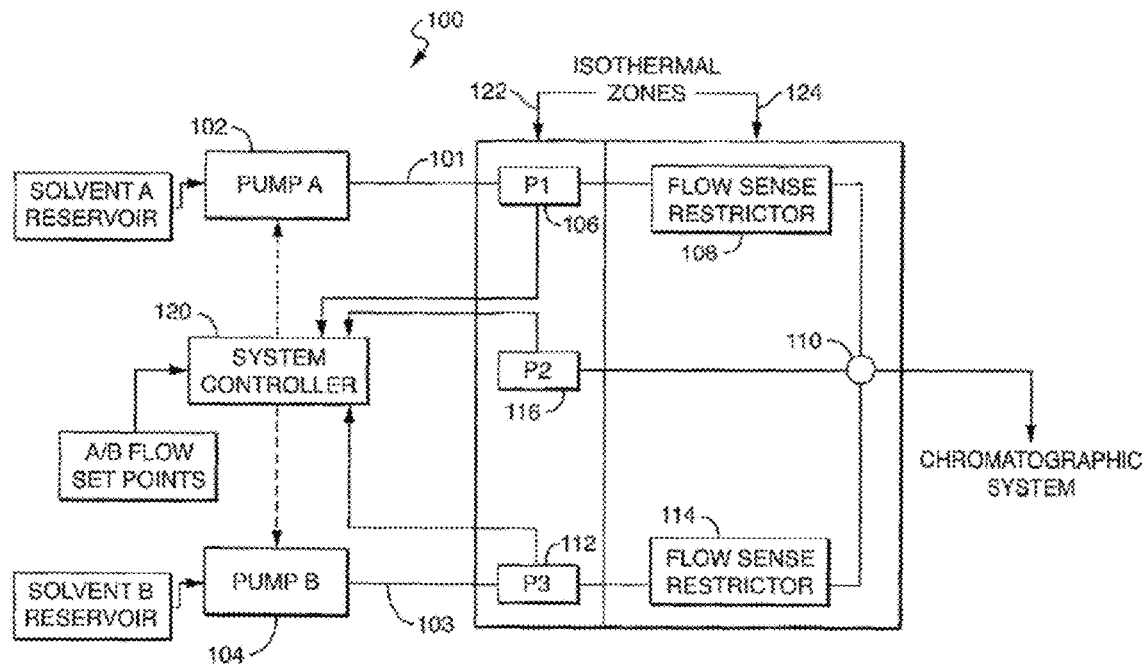
FIG. 1 depicts a prior art system for measuring and controlling flow.
Figure 2:
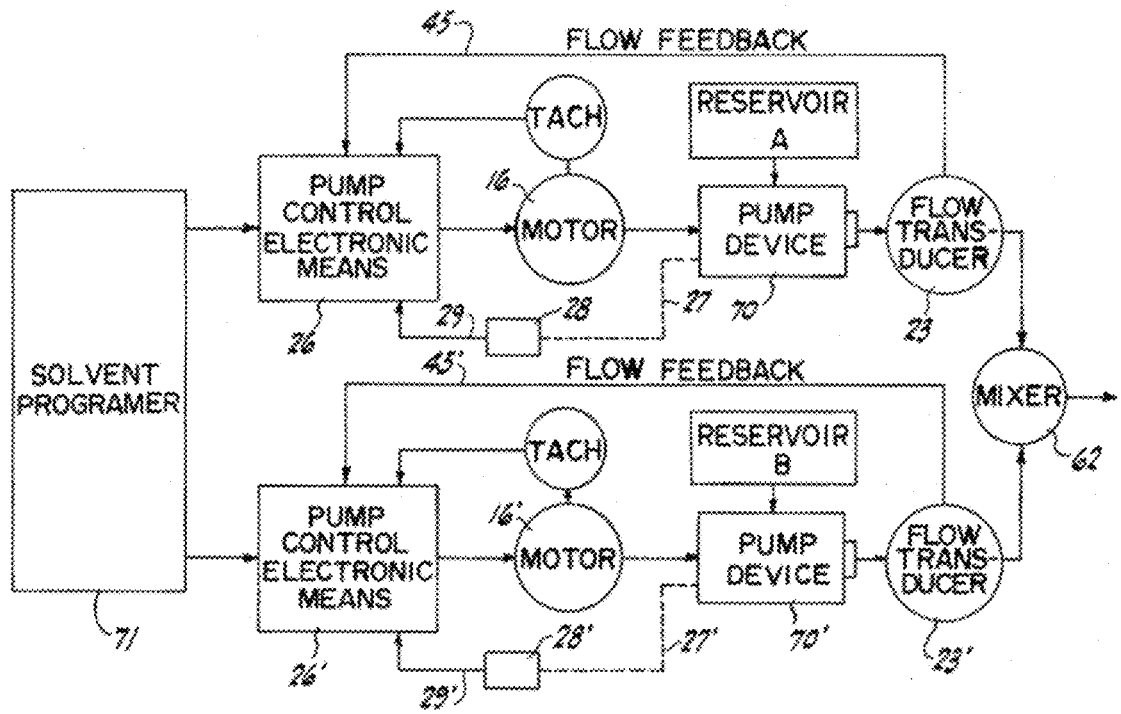
FIG. 2 depicts another prior art system for measuring and controlling flow.
Figure 3:
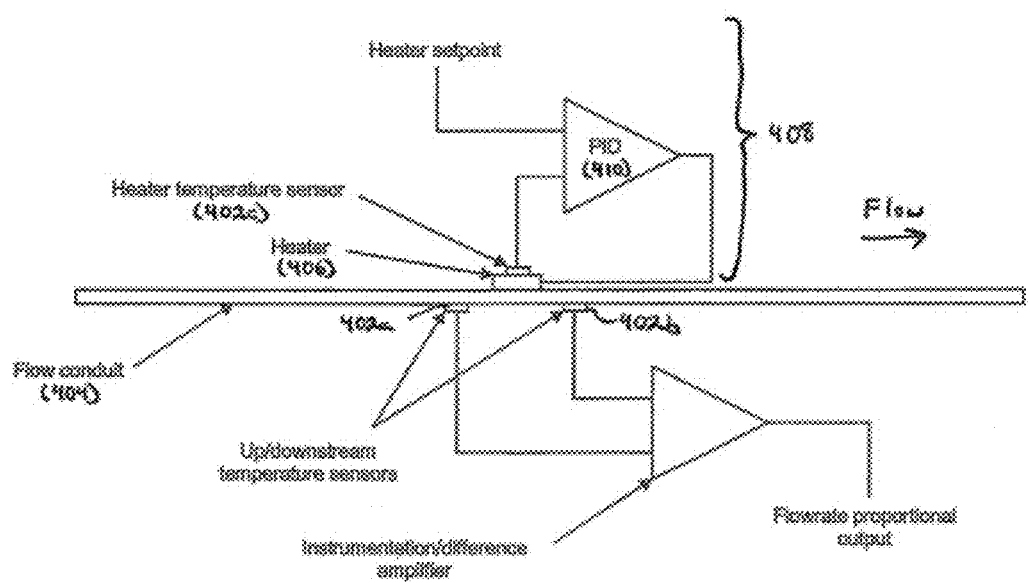
FIG. 3 depicts a further prior art system for measuring flow.
Figure 4:
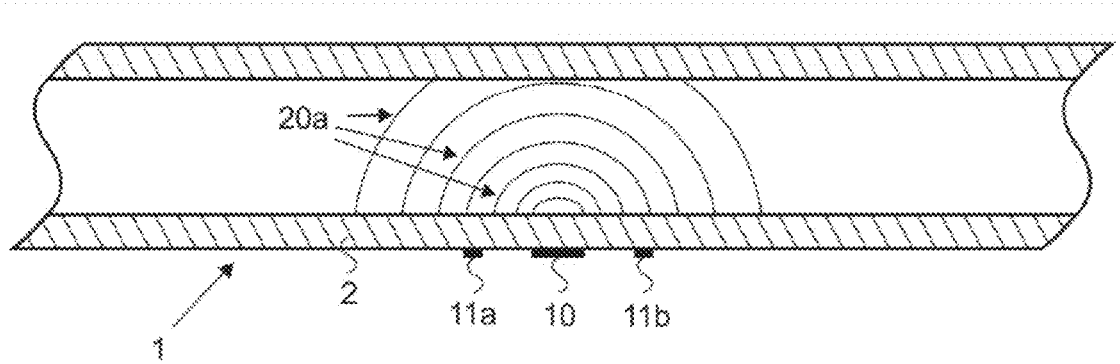
FIG. 4 depicts an exemplary system for measuring the flow in a configuration where the flow is zero.

In the following, the functional principle and behavior of thermal flow sensors will be explained in detail, based on an example. Some components of the actual sensor element (also referred to as flow measuring system) of such a thermal flow sensor are shown in FIG. 4. FIG. 4 depicts a thermal flow sensor at zero flow.

The sensor element comprises a tube 1, which in the depicted embodiment is an elongated capillary 1. The capillary 1 has a wall 2 that is formed by (e.g., consists of) a sufficiently pressure-resistant material, preferably glass, ceramic or metal. The fluid or liquid of which the flow is to be measured is located inside the capillary.

At the outer end of the wall 2 of the capillary 1, a heating element 10 is attached, and two temperature sensing elements 11a and 11b (also referred to as temperature sensors 11a, 11b) are arranged to the left and right of it, preferably at the same distance.

As an example, temperature sensors 11a, 11b on the basis of thermal elements (i.e., thermocouples) are used, as they provide an approximately linear signal and do not measure an absolute temperature but the difference between the temperature at the capillary wall 2 and reference junction that has approximately the same temperature as the housing of the sensor. In this manner, changes in the ambient temperature are automatically compensated for.

If the fluid/liquid stagnates inside the capillary 1, i.e. if the flow inside the capillary 1 equals zero, the heat of the heating element 10 spreads evenly in all directions. What is thus created is a substantially rotationally symmetrical temperature profile, which is represented by isotherms 20a. The temperature profile is particularly symmetrical with respect to the heating element 10 and the two temperature sensors 11a and 11b. Thus, the temperatures of both temperature sensors 11a, 11b are the same, or the differential temperature between them is zero.

The differential temperature signal is usually linearized in an evaluation circuit. At that, the differential temperature is converted into a flow rate based on a recorded calibration curve or look up table, for example in nanoliter per minute (nL/min).

In an analysis of the sum temperature that is suitable for the measurement of higher flow rates, instead of the difference between the temperatures, the sum of the two temperatures is analyzed. It reaches its maximum if the liquid stagnates, as the heat dissipation is at its lowest in that case.

Figure 5:
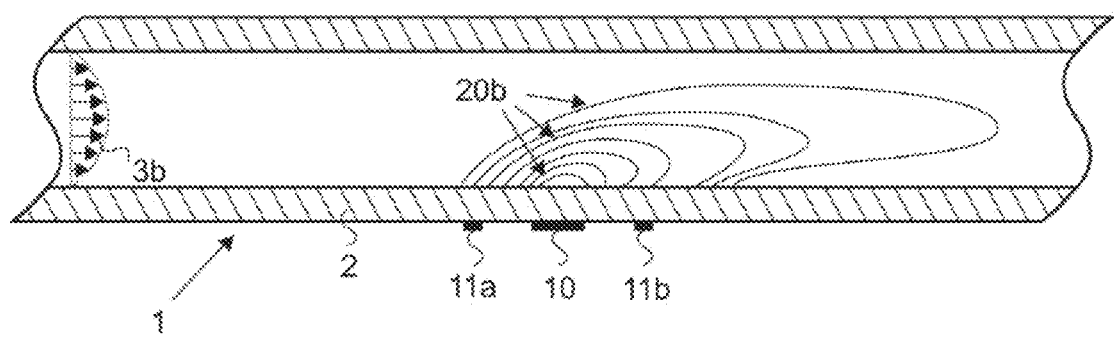
FIG. 5 depicts the system of FIG. 4 in a configuration having a low non-zero flow.

FIG. 5 depicts the case that the fluid/liquid moves in the capillary 1 from left to right, which will be referred to as a positive flow (that is, flow>0) in the following.

The internal diameter of the capillary 1 is so large that a laminar flow is created inside the capillary 1. In a straight elongated capillary 1, a parabolic velocity profile is created in that case, which is indicated by the arrows (velocity vectors) 3b.

This parabolic velocity profile distorts the temperature profile generated by the heating element 10 in flow direction. This can be seen from the changed shape of the isotherms 20b. The flow transports the liquid heated by the heating element 10 in flow direction, leading to a rise of the temperature of the temperature sensor 11b that is arranged downstream. On the other hand, the liquid that is heated at the temperature sensor 11a is constantly replaced by new liquid, so that its temperature drops. Thus, a differential temperature results between the temperature sensors 11a and 11b, which is a measure for the flow through the sensor, and is provided as a flow rate signal after linearization in the evaluation circuit. At a low flow, the sum temperature is influenced by the flow rate only to a small degree and cannot be analyzed in any useful manner in this range.

Figure 6:
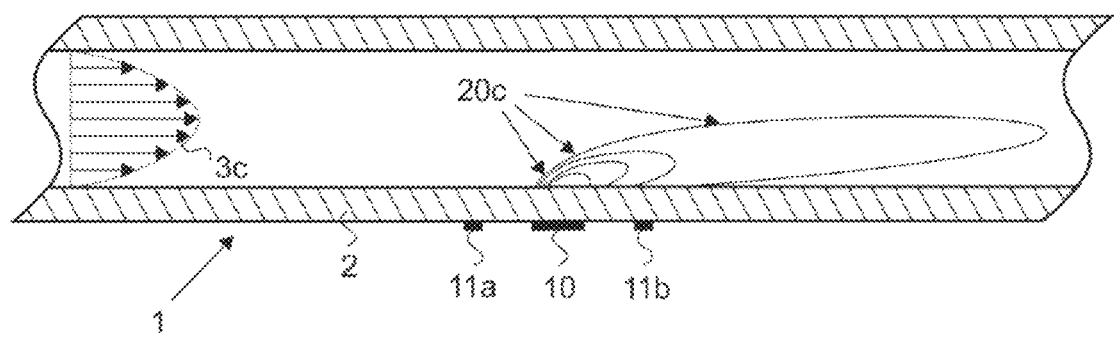
FIG. 6 depicts the system of FIG. 4 in a configuration having a flow higher than the flow in FIG. 5.

At a higher flow, which is indicated in FIG. 6 by longer velocity vectors 3c, the flow profile becomes yet more unsymmetrical. As can be seen from the shape of the isotherms 20c, the upstream temperature sensor 11a is now barely heated by the heating element 10. As a result of that, the differential temperature between the sensors 11a and 11b keeps increasing. It is again linearized and provided as the flow rate signal.

At an even higher flow, more and more heat is dissipated through the liquid, so that the differential temperature reaches a maximum and subsequently decreases again. In this range, a meaningful analysis of the differential temperature is no longer possible. Instead, the sum temperature of the sensors 11a and 11b may be analyzed. Since more heat is dissipated at a higher flow, the heat strongly decreases with an increasing flow rate and can already be linearized and then used as a measure for the flow.

Figure 7:
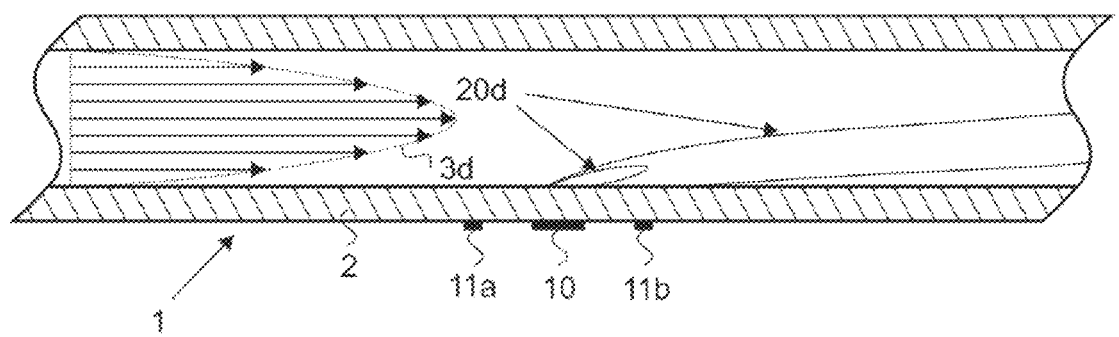
FIG. 7 depicts the system of FIG. 4 in a configuration having a very high flow.

At a very high flow, even more heat is dissipated through the liquid, so that generally lower temperatures are achieved. This is indicated in FIG. 7 by a lower number of isotherms as compared to FIG. 6.

Already in FIG. 6, the temperature sensor 11a was barely heated, and this is also not changed by the further increased flow. However, due to the increased heat removal, the temperature sensor 11b is at even higher flow rates (see FIG. 7) also heated to a lesser degree, so that the differential temperature is similarly low as when the flow is low.

Thus, a very low differential temperature can occur either as a result of a very low or an extremely high flow. Therefore the relation between the differential temperature and the flow is now ambiguous. At medium to high flow, the sum temperature shows an unambiguous and clear connection to the flow rate. Therefore, this signal can be used as a good measure for the flow.

Figure 8:
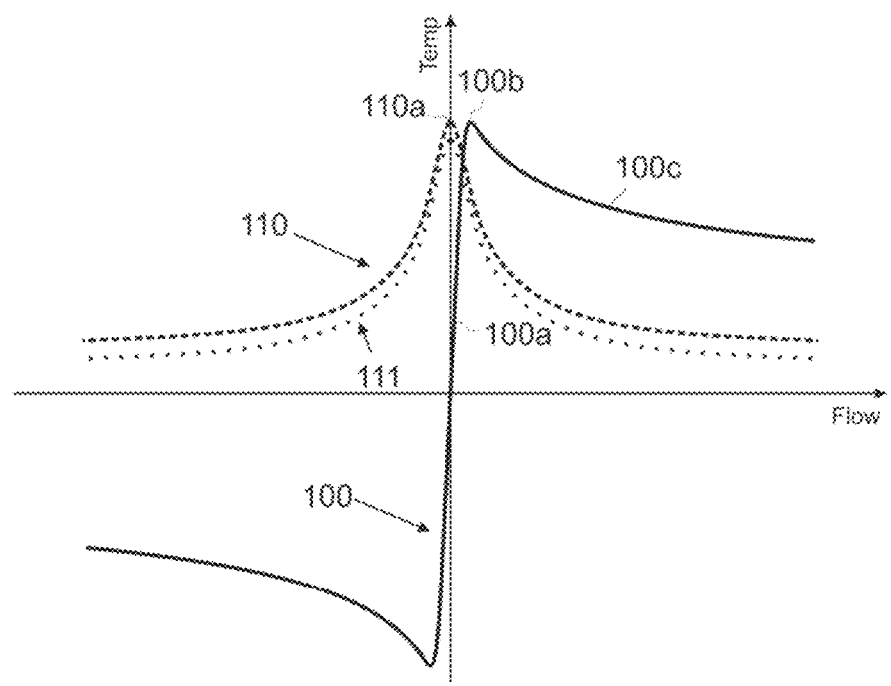
FIG. 8 depicts curves of the sum and differential temperatures against the flow.

The dependencies between flow and differential temperature as well as sum temperature are plotted in FIG. 8. The horizontal axis corresponds to the flow rate, the Y-axis corresponds to the measured differential temperature or sum temperature.

The dashed curve 110 shows the sum temperature. The curve extends symmetrically to the X-axis, i.e. negative flows result in the same sum temperature as positive flows of the same value. The curve has its maximum 110a at flow=zero, as in this case no heat is dissipated through the liquid. At low positive or negative flows, the heat removal through the liquid is negligible, therefore the shape of the curve remains almost horizontal at first, so that in this range no accurate analysis is possible. With slightly higher flows, the curve rapidly begins to fall steeply, so that it can be analyzed very well in this range. At very high flows, the curve becomes more and more flat.

The solid line 100 shows the differential temperature. To make the rendering more clear, the curve has been scaled in such a manner that its maximum is as high as in the curve 110. In actuality, the differential temperatures are substantially lower than the sum temperatures, therefore the curve would actually be substantially smaller in the vertical direction. The differential temperature extends in a point-symmetric manner with respect to the origin, i.e. negative flows result in a differential temperature that is as high as with positive flows, only with the reversed algebraic sign. At low flows, the curve initially has an approximately linear and very steep shape in the range 100a. At higher flows, the curve becomes increasingly non-linear and finally reaches a saturation point 100b. Here, the effect of the heat removal starts becoming dominant. At even higher flows, the curve keeps dropping in the range 100c, and ultimately becomes more flat.

A general challenge with thermal measuring principles is the influence of the ambient temperature or the sensor temperature, as well as of the temperature of the inflowing liquid. Since these influences act in the same way on both temperature sensors 11a and 11b in the flow sensor, the differential temperature does not change as a result of this, i.e. the curve 100 is almost not influenced by the changes in the ambient temperature or in the inflowing liquid.

In contrast to that, changes in ambient temperature have a direct effect on the temperature sum signal. Consequently, the entire curve 110 is displaced in the vertical direction. For example, if the ambient temperature is lowered, the result is a curve (curve 111) that is displaced downwards.

Since the curve has a very flat shape when the flow is high, such a vertical displacement corresponds to an extremely large error of the measured flow.

Thermal elements (thermocouples) may be used for the temperature sensors 11a and 11b. Due to their functional principle, thermocouples always measure the difference of the temperatures between a measurement site and a reference site. The reference site is arranged inside the sensor 11a, 11b in such a manner that it substantially measures the temperature of the sensor housing, and the measurement site measures the temperature at the capillary wall 2. Since both temperatures change equally when the ambient temperature changes, the influence of the ambient temperature on the sensor signal is largely eliminated in this manner. However, the temperature at the measurement site, i.e. the capillary wall 2, is also significantly influenced by the temperature of the inflowing fluid/liquid or of the medium, which will be referred to as the medium temperature in the following. This influence cannot be eliminated by using thermocouples. Due to the flat shape of the curve 110, already small changes in the medium temperature result in big changes of the sensor signal.

Due to these reasons, the precision of flow sensors according to the state of the art is considerably inferior in the analysis of the sum temperature, in particular at very high flow rates, than at low flow rates and in the analysis of the differential temperature. Measuring errors of 10% and more may easily occur in prior art systems, which is useless for common HPLC applications.

E.g., to create a wide range flow sensor that facilitates an accurate flow measurement in the entire range that is covered by the curves, the influence of the ambient temperature or the medium temperature on the temperature sum signal is advantageously eliminated.

According to embodiments of the present invention, the influence of the ambient temperature and the medium temperature can be eliminated by keeping the temperature of the flow sensor and the medium temperature constant. In the following, this is referred to as temperature control.

In flow sensors that have a housing with good thermal conductivity, for example a metal housing, the temperature control of the sensor can be effected by connecting the housing to a temperature-controlled surface, for example a metal plate, in a way that enables good thermal conductivity. The temperature-controlled surface can be maintained at a constant temperature. One solution is the use of heating elements that are in thermal contact with the temperature-controlled surface, and one or multiple temperature sensors that are likewise in thermal contact with the temperature-controlled surface, wherein the heating power is set by a control circuit in such a manner that the temperature corresponds to a given set value. Here, the temperature-controlled surface can also be the sensor housing itself, or the control can be integrated partially or entirely into the sensor.

In such a temperature control by means of simple heating elements no active cooling is possible. Therefore, in this case, the set value of the temperature must be chosen to be higher than the expected highest ambient temperature of the arrangement. If instead of the heating elements, Peltier coolers are used, for example, they can be used to provide active heating as well as active cooling, as long as a sufficient heat supply or heat removal is ensured at the other side of the Peltier cooler. In that case, temperature control to normal ambient temperature or even below that is possible, as well. However, this solution entails considerably more effort than a temperature control by means of heating elements.

According to embodiments of the invention, the medium temperature is also kept constant. E.g., for this purpose, an eluent preheater may be arranged in flow direction directly in front of the flow sensor, with the eluent preheater bringing the medium to the desired temperature. There are active and passive eluent preheaters available in different designs.

Figure 9:
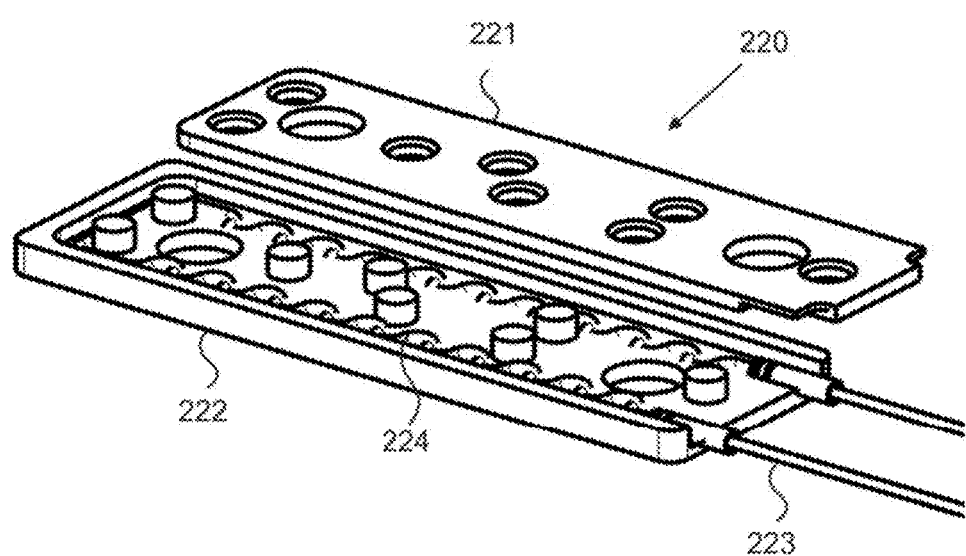
FIG. 9 depicts a preheater to be employed in embodiments of the present invention.

FIG. 9 shows, by way of example, a simple eluent preheater 220, which may be a passive preheater 220, in an opened state. It comprises a continuous capillary 223, which in the assembled state is fitted in such a manner between the housing halves 221 and 222 that a good heat transfer is ensured between the capillary 223 and the housing halves 221, 222.

The area 224 of the capillary, which is located in the interior of the housing, is bent in a meandering shape. As a result, the flow conditions in the capillary are changed in such a way that a particularly good heat exchange results between the medium and the capillary. In addition, this makes it possible to accommodate a greater capillary length inside the housing.

E.g., in order to achieve a constant medium temperature, the housing of the eluent preheater is maintained at a constant temperature. Since the two housing halves 221 and 222 are connected so as to have a good thermal coupling in the assembled state, it is sufficient if one of the housing halves is in good heat contact with a temperature-controlled surface. In that case, the thermal resistance between the liquid and the temperature-controlled surface is very small, so that the medium temperature at the exit of the eluent preheater is practically equal to the temperature of the temperature-controlled surface.

Here, it may be advantageous to use a common temperature-controlled surface that is in thermal contact with the flow sensor as well as with the eluent preheater 220. In this case, the liquid is brought to practically the same temperature as the sensor, i.e. the liquid that flows from the eluent preheater 220 into the sensor has the same temperature as the sensor itself. In this way, a heat exchange between the liquid and the sensor housing, which would falsify the sensor signal, is avoided.

Figure 10:
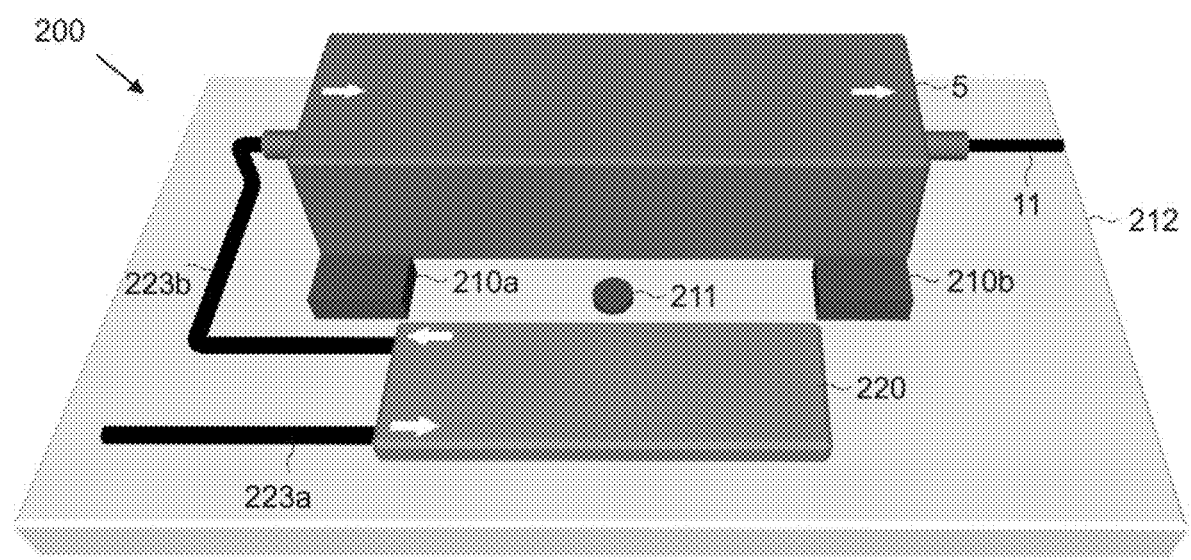
FIG. 10 depicts a flow sensor system according to embodiments of the present invention.

Such an arrangement according to an embodiment of the invention is shown in FIG. 10. The flow sensor 5 and the eluent preheater 220 (which may also be generally referred to as fluid temperature control element) are mounted onto a common temperature-controlled surface 212 (which may also be referred to as heat transfer element 212) having a good thermal conductivity. The temperature control is effected via two heating elements 210a and 210b as well as the temperature sensor 211. The electrical connections of these components are not shown with a view to rendering the illustration more clear. During operation, the temperature of the temperature-controlled surface 212 is detected by the temperature sensor 211, and the heating power of the heating elements 210a and 210b is controlled in such a manner by the electronic control circuit that the temperature corresponds to the set value. This control circuit can be realized as a separate circuit, or can be integrated into the control of the complete device, and is also not shown with a view to rendering the illustration more clear.

Temperature differences may still occur even with such a temperature control, since even materials having a good thermal conductivity, such as for example aluminum, have only a limited thermal conductivity. Hence, changes in ambient temperature can influence the local temperature distribution inside the arrangement and thereby impair the reproducibility of the flow measurement. In order to avoid this, it may be advantageous to surround the entire arrangement shown in FIG. 10 with heat-insulating material (e.g. with such a housing) so as to reduce heat flows between the arrangement and the environment, or the temperature differences within the arrangement resulting there from. This heat insulation is not shown in FIG. 10, so that the inner components of the structure may be seen. Alternatively, it is also possible to install the entire arrangement inside a housing, which in turn is also temperature-controlled. This solution is space-saving and very effective, but requires additional technical effort.

Since all components shown in FIG. 10 are connected to each other in a manner that ensures good thermal conductivity, they have almost exactly the same temperature during operation. This temperature will be referred to as the target temperature in the following.

The medium or the liquid reaches via an inlet capillary 223a first the eluent preheater 220, where it is brought to target temperature. The connecting capillary 223b guides the medium into the flow sensor 5. Even at very low flow rates, there is no significant change in temperature inside the capillary 223b, since the capillary is kept at target temperature by means of heat conduction from the eluent preheater 220 on the one hand and from the flow sensor 5 on the other. The flow sensor 5 itself is also mounted on the temperature-controlled surface 212, and is thus likewise maintained at target temperature.

In this manner, the influences of the ambient temperature and the medium temperature are eliminated to a great extent.

Instead of bringing the flow sensor 5 and the eluent preheater 220 to the target temperature through a common temperature-controlled surface, this can also be effected by means of separate temperature control devices for both components. In this case, different target temperatures for the eluent preheater 220 and the flow sensor 5 would also be possible. However, there is no relevant advantage to be expected from that, so that the common temperature control is the preferred embodiment.

The arrangement of the components shown in FIG. 10 is to be understood as merely an exemplary embodiment. Depending on the overall structure, the components can also be arranged in a different manner.

For example, if a sufficiently good thermal insulation is provided, only one single heating element 210 may be sufficient. Conversely, it is also possible to arrange more than two heating elements 210a, 210b in a distributed manner in order to achieve a more uniform temperature distribution. Likewise, multiple temperature sensors 211 may also be used.

According to embodiments of the invention, the measuring accuracy of the flow sensor 5 can be improved by temperature-controlling the flow sensor 5 and the medium that enters the flow sensor 5 in such a manner that a reproducibility sufficient for HPLC applications is achieved in differential temperature analysis as well as in sum temperature analysis.

The entire arrangement 200 including all components shown in FIG. 10 as well as the thermal insulation that is not shown will be referred to as temperature-controlled flow sensor in the following.

Furthermore, in embodiments of the present invention, different measuring ranges may be combined, as described below.

In flow sensors that are currently available, differential temperature analysis and sum temperature analysis represent two different operating modes, if these possibilities are even offered at all. Such sensors can work only in one or the other operating mode.

As will be explained in the following, according to embodiments of the invention, a single continuous measuring range including the entire low flow range is created by combining both operating modes. For this purpose, the differential temperature signal as well as the sum temperature signal are analyzed, i.e. both signals are available in parallel or quasi simultaneously, i.e., by reading both signals in quick succession in an alternating manner. However, it will be understood that flow sensors may also be equipped with appropriate hardware so as to make both signals available at the same time.

In typical HPLC applications, the total flow is constant in most cases, and is comprised of two or more partial flows with a variable mixing ratio. Here, the mixing ratio, and thus the partial flows, are varied during the usual gradients in the range of 0 to 100% of the total flow. Each flow sensor is responsible for one of these partial flows. For regulating the partial flows, the flow sensors should ideally provide an interruption-free and exact flow signal in the entire range between 0 and 100% of the total flow.

E.g., to create a flow sensor according to embodiments of the invention with a continuous, interruption-free and exact measuring range that covers the entire low flow range, it will first be considered what kind of information is yielded by the differential temperature and the sum temperature signals in which flow range.

FIG. 11 again shows the differential temperature signal (curve 100) and the sum temperature signal (curve 110) of the flow sensor. In addition, a number of ranges I to VI is mapped above and below the X-axis.

The differential temperature, i.e. the curve 100, provides a signal with the right algebraic sign in the entire positive and negative flow range. In section I, the shape of the curve is very steep, so that a very exact analysis is possible here. In the sections II, the curve passes the maximum 101 or the minimum 102, where the slope of the curve has a zero-crossing. Thus, no analysis or only an inaccurate analysis is possible in the sections II. In the sections III, the differential temperature has a sufficiently high slope again, so that analysis is possible.

The sum temperature, i.e. the curve 110, runs symmetrically with respect to the Y-axis, and is monotonically increasing for negative flow rates and monotonically decreasing for positive flow rates. Therefore, in the sections V and VI, the curve provides a signal that is a measure for the value of the flow rate. Here, a differentiation between positive and negative flow is not possible. In the neighborhood of the maximum 111, the shape of the curve is very flat or even horizontal at flow rate zero. Therefore, only a rough statement about the flow rate is possible in section IV. In the sections V, the curve 110 has a very steep shape, so that a relatively exact analysis is possible here. In the sections VI, the curve 110 becomes increasingly flat, so that the analysis becomes increasingly inaccurate at higher positive or negative flow rates. In this range, the curve 100 provides a more accurate flow signal, especially since the differential temperature is largely unsusceptible to changes in ambient and medium temperature.

Thus, the differential temperature 100 provides a signal with the right algebraic sign in the entire range, while the sum temperature 110 reflects the value of the flow rate at least approximately in the entire range. By analyzing these two signals, it can already be determined whether the flow is positive or negative, and in which of the ranges I to III or IV to VI it is. Depending on the respective range, the flow rate is then determined either based on the differential temperature 100, on the sum temperature 110 or on a combination of the two.

At a low flow rate, i.e. in the range I, the curve 100 is used. In the range II, the curve 100 does not provide an accurate signal, instead the curve 110 or the range V can be used here for this purpose. If the flow rate is even higher, the precision of the curve 110 decreases, so that here the curve 100 or the range III is used once more.

Since all the defined ranges for curve 100 and curve 110 overlap, an accurate analysis is possible for the entire positive and negative flow range.

Figure 11:
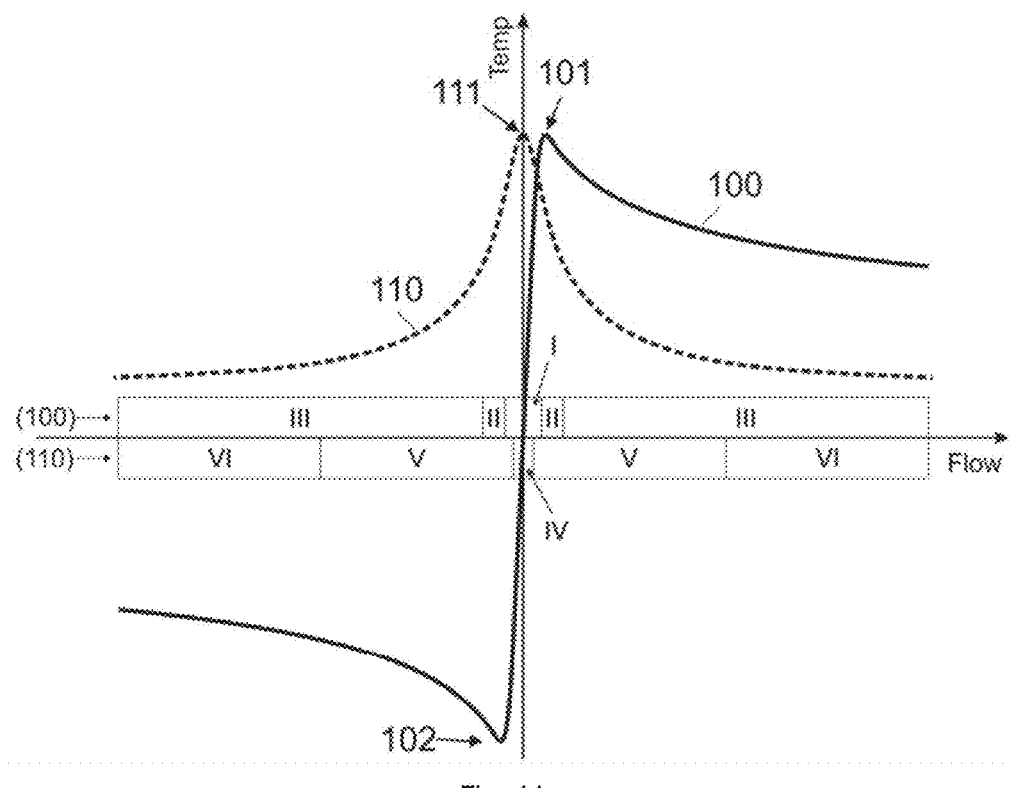
FIG. 11 depicts curves corresponding to the sum and differential temperatures against the flow, where different sections of flow are identified.

The correlations between the difference or sum temperatures (curve 100 or 110, referred to as temperature signals in the following) and the flow rate are both nonlinear, as can be seen in FIG. 11. Thus, linearization is required in order to obtain a linear signal that reflects the measured flow rate. Numerous methods for linearization of signals are known. In the simplest case, a look up table is recorded that gives the correlation between the temperature signal and the flow rate for a number of sampling points. If the temperature signal does not fall exactly on one of the sampling points, the flow rate is calculated by interpolation between neighboring sampling points. Alternatively, it is also possible to map the functional correlation between the temperature signals and the flow rate by suitable mathematic functions, for example polynomials, exponential functions, or splines. If these functions are calculated in such a manner that the X-values correspond to the temperature signal and the Y-axis corresponds to the flow rate, the temperature signal must merely be inserted into the function to obtain the flow signal. Due to mathematical reasons, in that case the function must be calculated sectionwise, if necessary.

Independently of the kind of the function used, the look up table or function must be determined by calibrating the sensor. Here, a known flow rate is for example guided through the sensor for each sampling point, and the associated temperature signal is analyzed. The sampling points or the parameters of the used functions are stored. Depending on the production tolerances of the sensor, it may be sufficient to perform this calibration just once and then use it for all sensors of the respective type, or it may be necessary to calibrate every single sensor individually. The linearization can be performed in the sensor itself or in the further signal path, respectively.

As has already been described above, the differential temperature as well as the sum temperature can be analyzed only in certain sections. For this reason, a linearization is only necessary in these sections. Such a linearization by section is significantly easier from the mathematical point of view and in addition more accurate than a linearization of the entire curve 100 or 110.

The differential temperature (curve 100) is only linearized in the analyzable sections I and III, the sum temperature (curve 110) is linearized only in the sections V.

Here, the sum temperature is multiplied by the algebraic sign of the differential temperature signal to obtain a sum temperature signal with the correct algebraic sign.

Figure 12:
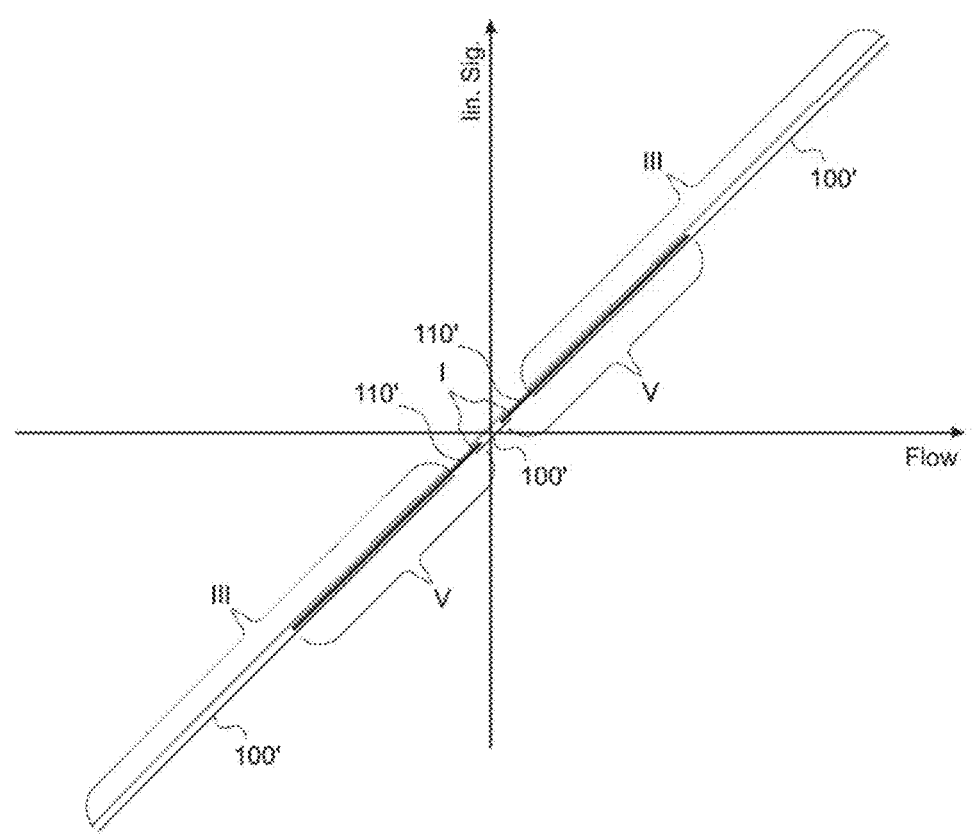
FIG. 12 depicts linearized correlations between the flow and linearized temperature signals.

Regarding the linearization of the different sections of the temperature signals, reference is made to FIG. 12. FIG. 12 shows the shape of the analyzable linearized curve sections I and III of the differential temperature (curve 100') as a double line, and shows the shape of the curve sections V of the sum temperature (curve 110'), which is corrected with respect to its algebraic sign, as a simple bold line. The linearized curves 100' or 110' all lie on the same straight line having the slope 1.

The sections I and V overlap in a relatively small area. There is a (substantially larger) overlapping between the sections V and III. As will be explained in the following, these overlappings may be used to avoid any signal jumps due to possible inaccuracies.

A general challenge when switching measuring ranges or the operational modes of sensors and measuring devices is that, as a result of unavoidable inaccuracies and drift effects, measuring errors occur that have different effects in the individual measuring ranges or operational modes. This challenge is particularly pronounced in the flow sensors that are discussed herein, since the analysis of the sum temperature represents a different measuring principle than the analysis of the differential temperature.

As a consequence of the inaccuracies, the linearized curve sections are overlapped by artefacts such as noise, non-linearities and zero point errors, which in addition have different impacts in the individual sections. In this case, given the same real flow rate, an analysis of the differential temperature would lead to a slightly different flow signal than an analysis of the sum temperature. If one simply switched between the analysis of the differential temperature and the analysis of the sum temperature at a certain point, a signal jump would occur.

In a closed control circuit that is designed to regulate the flow rate to a predefined value, such signal jumps lead to an instability of the controller, as the latter tries to counteract the ostensive change of the flow rate. As a result, the actual flow rate is changed into the reverse direction, which in turn causes a new signal jump in the reverse direction. Such undesired behavior is advantageously avoided.

According to embodiments of the invention, this is done by utilizing the overlapping areas between the sections I and V, or V and III in FIG. 12. In these overlapping areas, a linearized differential temperature signal as well as a linearized sum temperature signal are simultaneously present. Based on the two signals, an overall signal is calculated which comprises the two individual signals with different weightings.

This will be explained in the following based on FIG. 13.

Figure 13:
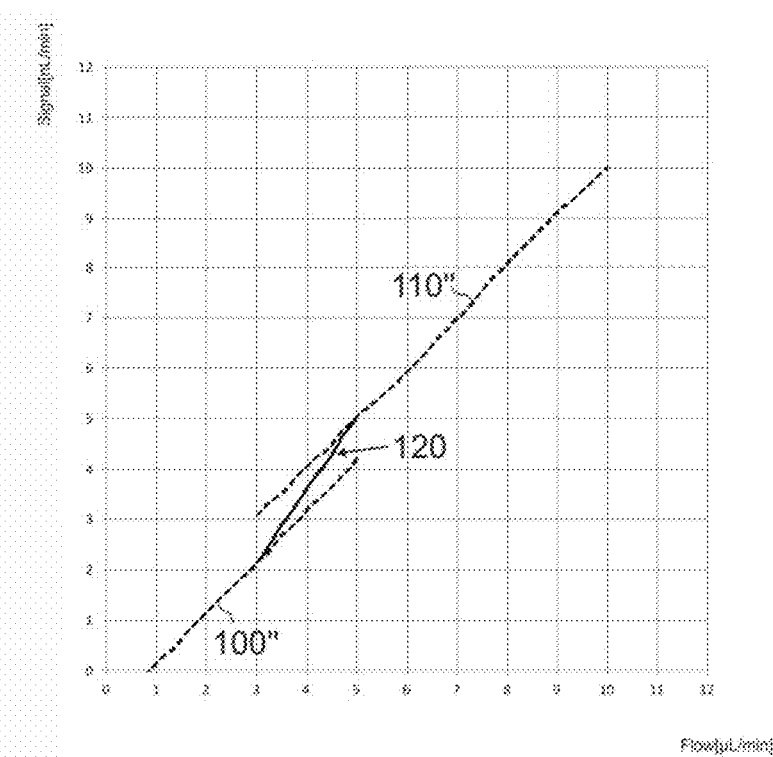
FIG. 13 illustrates how a transition curve may be employed to connect different linearized temperature signals having an overlapping flow range, according to embodiments of the present invention.
Figure 14:
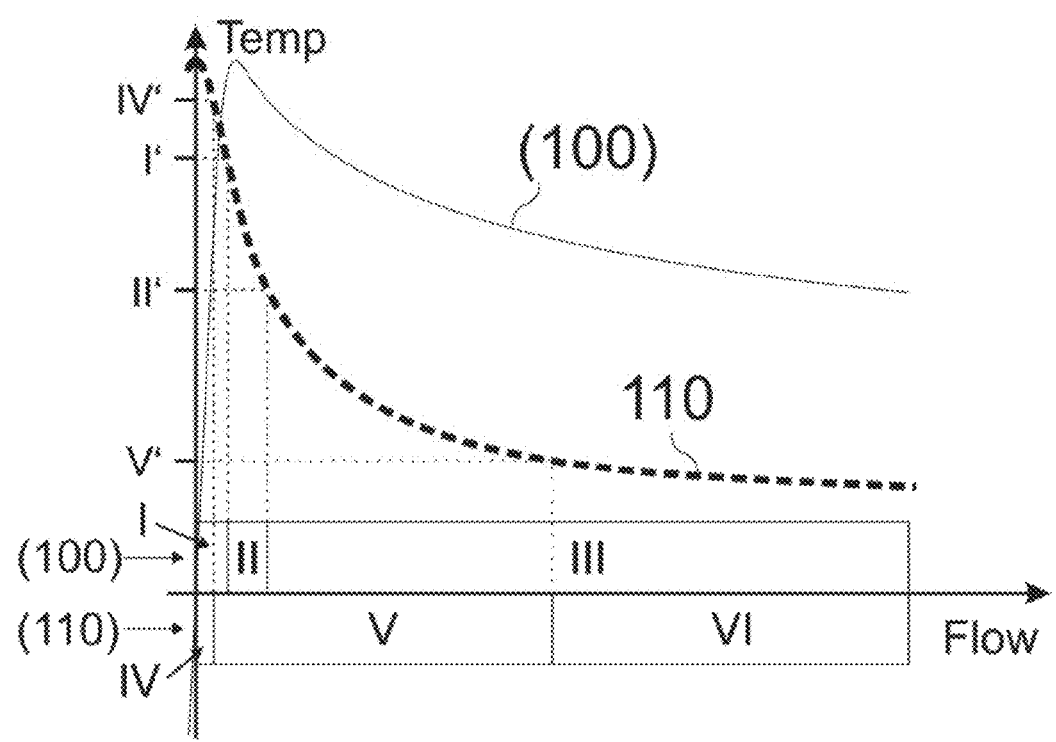
FIG. 14 depicts curves corresponding to the sum temperature signal and the differential temperature signal, used to define different sections of the flow signal.

FIG. 13 shows, by way of example, a linearized differential temperature signal 100" that covers the flow range up to 5 µL/min and includes typical errors like offset shift and noise. Due to the inaccuracies the signal does not have a straight shape and does not run exactly through the origin of the coordinate system. Further, a similar inaccurate sum temperature signal 110" is shown covering the flow range from 3 µL/min upwards. In the overlapping area between 3 and 5 µL/min, both signals are available. However, they do not coincide as a result of the inaccuracies. At a low flow rate, only the differential temperature signal can be used. If the flow rate increases, the differential temperature signal is no longer available from 5 µL/min on, so that at that point at the latest the sum temperature signal must be switched to. The result in this case is a signal jump from approximately 4.2 µL/min to approximately 5.0 µL/min.

In this example, an overlapping area of 3 µL/min to 5 µL/min is present in which the differential temperature signal as well as the sum temperature signal are available. According to the invention, a transition curve 120 is calculated in this overlapping area, with this transition curve 120 representing a continuous transition from curve 100" to curve 110". Thus, the linearized curve 100" is used in the flow range of up to 3 µL/min, the transition curve 120 is used between 3 and 5 µL/min, and the linearized curve 110" is used above 5 µL/min.

According to the invention, the calculation of the transition curve is carried out by means of a variable weighting of the linearized curves 100" and 110". Different weighting functions may be used. Usually a simple linear weighting is sufficient, which will be explained based on the following example. By using more complicated weighting functions, it may be achieved that the transition curve starts and ends with even the same slopes as the adjoining linearized curves. However, in practice the theoretic advantage is of minor relevance.

As an example, a weighting function is used that has the value zero at 3 µL/min and increases in a linear manner until reaching the value 1 at 5 µL/min. This corresponds to the following linear equation, wherein FI indicates the flow rate in µL/min:

$$g=(FI-3 \text{ µL/min})/(5 \text{ µL/min}-3 \text{ µL/min})$$

The curve 110" is weighted with the factor g, and the curve 110" is weighted with 1−g. At 3 µL/min, the curve 110" is thus weighted with the factor 0, and the curve 100" is weighted with the factor 1. It is the other way around at 5 µL/min: The curve 110" is weight with the factor 1, and the curve 100" is weighted with the factor 0. In the range in between, the weighting function varies in a linear manner with the flow rate. Thus, for example at 3.5 µL/min, the curve 110" is weighted with the factor 0.25, and the curve 100" is weighted with the factor 0.75. The function values of the transition curve 120 are obtained by multiplying the function value of the curves 100" and 110" by the weightings, and by subsequently adding the results.

The transition curve 120 appears not "smooth" as the noise floor from the sensor signals is still included.

Transition curves can also be calculated for all other overlappings in the same manner.

The overlapping between the ranges V and III is very large, i.e. the differential temperature as well as the sum temperature can be analyzed in a very large flow range. Although it would be easily possible to calculate the transition curve in this entire range, it should be taken into consideration that the differential temperature yields more accurate results in this range than the sum temperature. Therefore, it is more expedient to analyze only the differential temperature in a relatively large part of this range, and to choose the transitional area to be correspondingly smaller.

In keeping with the above considerations, determining the analyzable sections and also calculating the transition curves is always carried out based on the flow rate. However, the actual flow rate is not yet known at this point, as it is precisely what is supposed to be determined by means of these analyses.

Thus, for determining the ranges and for calculating the transition curves, the non-linearized sum signal is used. FIG. 13 shows the same signals and sections as FIG. 11. Since the curve 110 is symmetrical to the X-axis, it is sufficient to look at the 1$^{st}$ quadrant.

The sum temperature signal (curve 110) is monotonically decreasing in the entire 1$^{st}$ quadrant. For this reason, each of the transitions between the sections I/II, II/III, IV/IV and V/VI can be assigned in an unambiguous manner to a corresponding sum temperature signal or to a point on the Y-axis, respectively. Here, point I' corresponds to the transition I/II, point II' corresponds to the transition II/III, point IV' corresponds to the transition IV/V, and point V' corresponds to the transition IV/V. It will be understood that these points denote certain values of thresholds of the sum temperature signal 110. The sum temperature signal at point IV' will also be referred to as the turning point threshold IV' (as it is the point closest to the turning point); point II' will also be referred to as first steep threshold II'; point I' will also be referred to as second steep threshold I' (as these threshold lie on the section of the sum temperature vs. flow curve that is relatively steep); and point V' will also be referred to as flat threshold V' (as this threshold lies on the section of the sum temperature vs. flow curve that is relatively flat).

Based on the sum temperature signal it can thus be unambiguously determined whether the sum temperature signal, the differential temperature signal, or a transition curve is to be used for determining the flow rate. The weight function for the transition curve can also be calculated directly from the sum temperature signal. In that case, it will be non-linear with respect to the flow rate, but that is of no relevant difference.

Table 1 shows an example of such an analysis.

TABLE 1

| measured sum temperature | explanation of the analysis | weighting sum temperature | differential temperature |
|---|---|---|---|
| >IV' | section IV | 0 | 1 |
| I' ... IV' | transition I/V | (ST − IV')/(I' − IV') | 1 − (ST − IV')/(I' − IV') |
| II' ... I' | section II | 1 | 0 |
| V' ... II' | transition V/III | 1 − (ST − II')/(V' − II') | (ST − II')/(V' − II') |
| <V' | section III | 0 | 1 |

In order to obtain the overall signal of the flow sensor according to the invention, at first the non-linearized sum temperature ST is determined. Subsequently it is verified based on the first table column in which of the indicated ranges the value ST is located. The weighting factors for the sum temperature and the differential temperature are determined in correspondence to the two right columns in the respective table row.

Then, the linearized sum and differential temperatures are multiplied by the corresponding weighting factors, and the two products are added.

This yields the measurement signal of the flow sensor according to embodiments of the invention.

Figure 15:
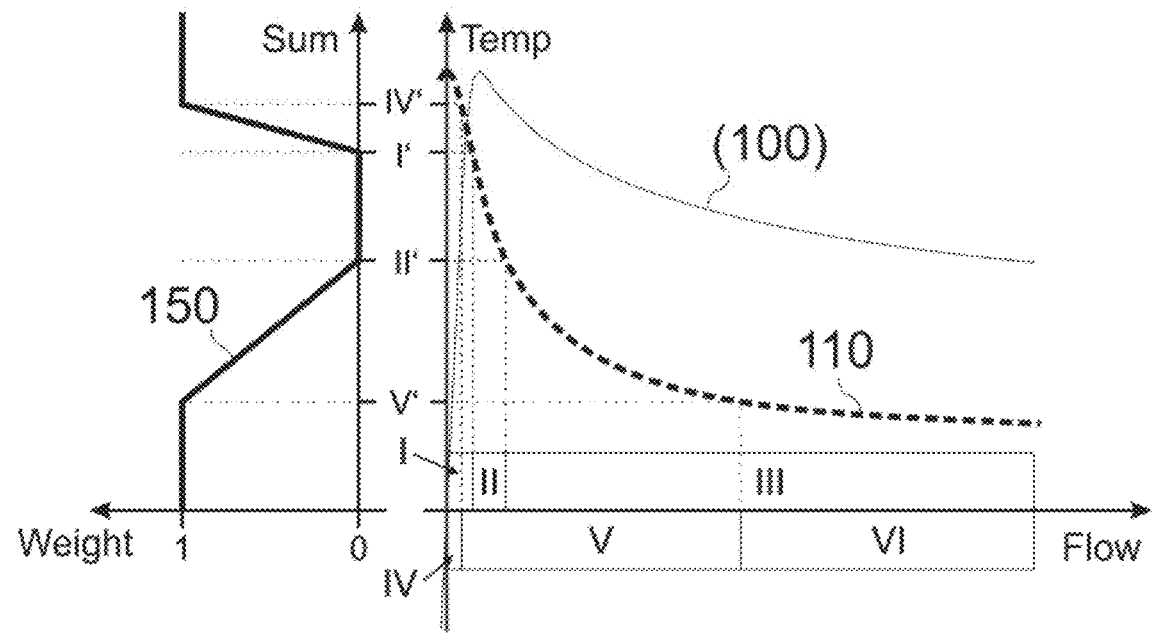
FIG. 15 corresponds to FIG. 14 and also depicts a graph with weights for the usage of a difference temperature signal and a sum temperature signal, according to an embodiment of the present invention.

The above described switching between the measurement modes and the weighting factors according to Table 1 can also be considered as the usage of a single weighting function for the complete measurement range, as is exemplarily depicted in FIG. 15.

FIG. 15 depicts a global or complete measurement function as line 150. The X-values of this function are the sum temperatures, which is why the X-axis is depicted vertically in FIG. 15. In accordance with Table 1, the weighting function has the value 1 for sum temperatures >IV' and <V'. I.e., here, only the difference temperature is used. For sum temperatures between II' and I', the weighting function has the value 0, i.e., only the sum temperature is used. In the ranges lying in between, i.e., I' to IV' and V' to II', the weighting function, which may also be referred to as "complete" or "global" weighting function, corresponds to the above described transitioning functions. The complete weighting function (line 150) comprises the straight segments and is continuous, but not continuous differentiable.

As described, the weighting function determines whether the linearized difference temperature signal, the linearized sum temperature signal, or a combination/mixture of these is utilized for the assessment. Herein, the present technology usually utilizes the signal that can be analyzed better. The analyzability of the signals does not change abruptly, but gradually. For example, the sum temperature (curve 110) is also substantially analyzable and usable at small flows, i.e., in region IV. Only when the flow approaches 0, the signal can no longer be analyzed, as the slope of the curve 100 approaches 0.

That means that the global or complete weighting function is not limited to line 150 depicted in FIG. 15. Instead, the global weighing function may also be realized differently. Thus, the weighting function can be defined in a manner being optional when regarding all technical considerations.

In particular, a smooth weighting function can be used, which does not comprise sudden or abrupt changes in the slope and is thus continuous differentiable. Such a weighting function is exemplarily depicted as curve 151 in FIG. 16. The curve is similar to curve 150 in FIG. 15. However, the curve 160 comprises curved transitioning functions and smooth transitions between the different regions. Furthermore, also the sections depicted as straight sections in curve 151 do not necessarily have to be straight, as it is not required that the weighting function is exactly 0 or 1.

Figure 16:
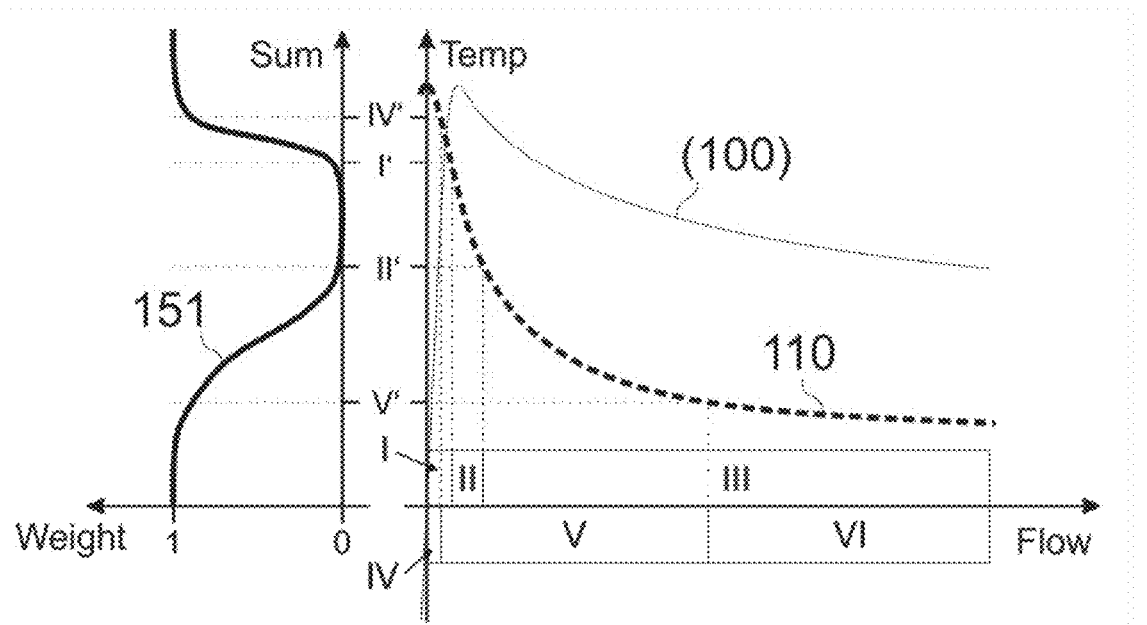
FIG. 16 corresponds to FIG. 14 and also depicts a graph with weights for the usage of a difference temperature signal and a sum temperature signal, according to another embodiment of the present invention.

As for the weighting function in FIG. 15, also for the weighting function in FIG. 16, the weighting of the linearized sum temperature signal and difference temperature signal is typically complementary, i.e., the weighing function is in the range 0 to 1 and the sum of the weighting function is 1. I.e., when the sum temperature is weighted with the function w, the difference temperature is weighted with the function 1−w.

While the above described method may be suitable to arrive at the flow, the skilled person will understand that other methods may also be employed.

In the above, signals received from the flow sensor have been linearized for both measuring areas (i.e., sum temperature signal and difference temperature signal) by using calibration curves. The calibration curves have been determined by corresponding measurements and a comparison with the actual flow rate. Then, the linearized measurements signals were combined to a single measurement signal covering the complete flow area.

In the below method that will now be described the sensor signals of both measurement areas will first be transformed by applying (different) mathematical functions, to correspond to one another to some extent in an overlap section. In the overlap sections, transformation functions between the transformed sensor signals (transformed difference temperature signal and transformed sum temperature signal) are calculated to arrive at a single, continuous signal. The linearization of this signal is again performed by means of a calibration measurement.

The now described method again originates at the sensor signals 100 (difference temperature) and 110 (sum temperature) depicted in FIG. 11. These signals are transformed such that they can be put together to a continuous signal in a simple manner.

This will be further illustrated by means of a simple example:

The sum temperature signal 100 is first vertically offset and re-scaled. Furthermore, the resulting signal is multiplied by the sign of the difference temperature signal, so that a negative flow rate result in a negative signal.

This transformation follows the following equation:

$$s_1(f)=(s(f)-\text{shift}_s)\cdot\text{scale}_s\cdot\text{sign}(d(f))$$

where s(f) sum signal of the sensor depending on the flow rate f;

$s_1(f)$ transformation of the function s(f);

$\text{shift}_s$ vertical offset;

$\text{scale}_s$ factor;

sign(x) function for the sign (−1 for x<0, 0 for x=0, 1 for x>0);

d(f) difference temperature signal of the sensor depending on the flow rate f.

Figure 18:
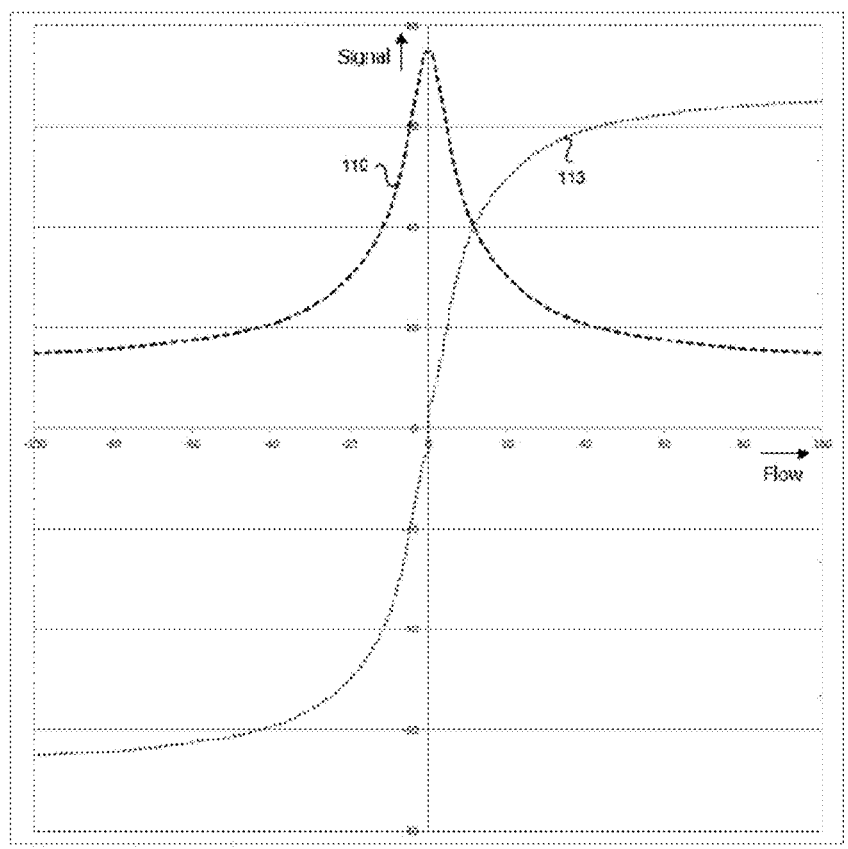
FIG. 18 illustrates the transformation of a sum temperature signal.

Curve 113 in FIG. 18 depicts the resulting function $s_1(f)$. Due to the multiplication with the sign of the difference temperature signal, the signal 113 increases for every flow. At flow rate 0, there is a discontinuity (a signal step). This is not problematic, as this area will not be used in the following.

The parameter $\text{shift}_s=80$ was selected such that the negative and the positive portion of the curve almost go through the origin, when disregarding the section generated by the flattening of the signal at very low flows. This value can be determined by applying a tangent to the curve 110 at the steepest sections of curve 110. The tangents of the negative and positive section intersect at this value.

The parameter $\text{scale}_s=-1$ is negative so that the signal increases with increasing flow rate. The absolute value can be determined discretionary so that the values of $s_1(f)$ are in a reasonable range.

Analogously to the sum temperature signal s(f), also the difference temperature signal d(f) is transformed. As the sign of this signal is already the same as the sign of the flow, no correction of the sign is necessary:

$$d_1(f)=(d(f)-\text{shift}_D)\cdot\text{scale}_D,$$

where d(f) difference temperature signal of the sensor depending on the flow rate f;

$d_1(f)$ transformation of the function d(f);

$\text{shift}_D$ vertical offset;

$\text{scale}_D$ factor.

Figure 19:
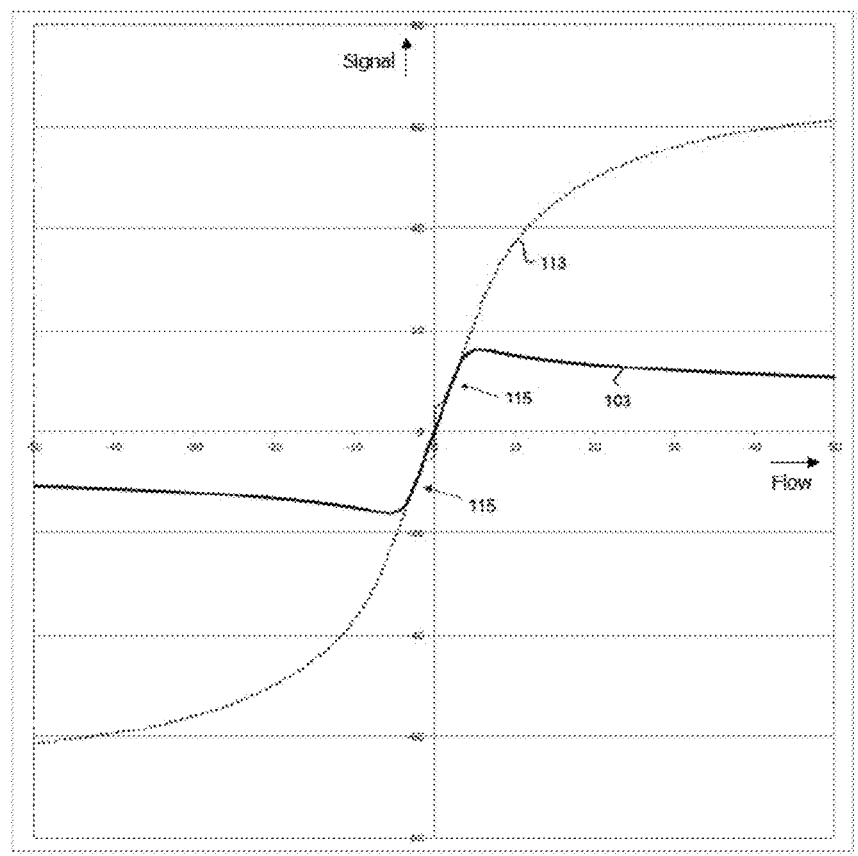
FIG. 19 depicts a transformed sum temperature signal and a transformed difference temperature signal

Curve 103 in FIG. 19 depicts the resulting function $d_1(f)$. In addition, the transformed sum temperature function (curve 113) is depicted. The value $\text{shift}_D$ may be used to balance potential zero-point-errors of the difference temperature signal. As no such errors were present in the present setup, $\text{shift}_D=0$ was used. The value $\text{scale}_D=0.22$ was selected so that the slopes of the approximately linear sections of curves 103 and 113 are approximately equal, at least for some overlap sections 115. Thus, overlap sections 115 as great as possible are generated, in which the transformed difference temperature signal 103 and the transformed sum temperature signal 113 correspond to one another well.

As depicted in FIG. 19, the transformed functions (curves 103 and 113) correspond very well to one another in the overlap sections 115. This is not by accident, but has been achieved by transforming the sum temperature signal so that it is approximately proportional to the flow rate in the overlap sections 115. At low flow rates, the difference temperature signal is almost linear to the flow rate anyway. This signal has been transformed so that its slope corresponds to the sum temperature signal in these sections.

For the parameters scales, shifts, scale), and shift), no generally applicable ranges can be provided. It depends on the signal scaling and the signal shape, as well as on manufacturing tolerances of the flow sensor used, which values are expedient. The parameters are therefore determined in a suitable manner as described above.

To obtain a composite sensor signal which is relevant in the whole flow area, a weighting function is desirable having smooth transitions between the curves in the overlap sections 115, even when both curves do not perfectly conform in the overlap sections 115. This weighting function is calculated in a similar manner as discussed above by starting with the transformed sum temperature signal 113.

In the discussed example, very simple transformations were used for the sensor signals for reasons of comprehensibility. This way the transition from a transformed difference temperature signal 103 to a transformed sum temperature signal 113 is only possible in the discussed overlap sections 115. At higher flow rates, there is no further overlap, such that a transition back to the difference temperature signal is not possible. Further, the difference temperature signal decreases at higher flow rates, while the transformed sum temperature signal 113 increases, so that the slope of a combined signal would change its sign. Thus, the relation between the signal and the flow rate would not be unambiguous.

To avoid these problems and to simplify the following description, in the present embodiment, the transformed sum temperature signal 113 is still analyzed at higher flow rates, i.e., in comparison to FIG. 15, the weight of the transformed difference temperature signal remains 0 at higher flow rates. Practical tests have shown that this is completely sufficient. Thus, a weighting function is needed resulting in the transformed difference temperature signal 103 for small positive of negative flow rates, and resulting in the transformed sum temperature signal 113 for high positive or negative flow rates, and resulting in a smooth transition for the overlap sections.

Figure 20:
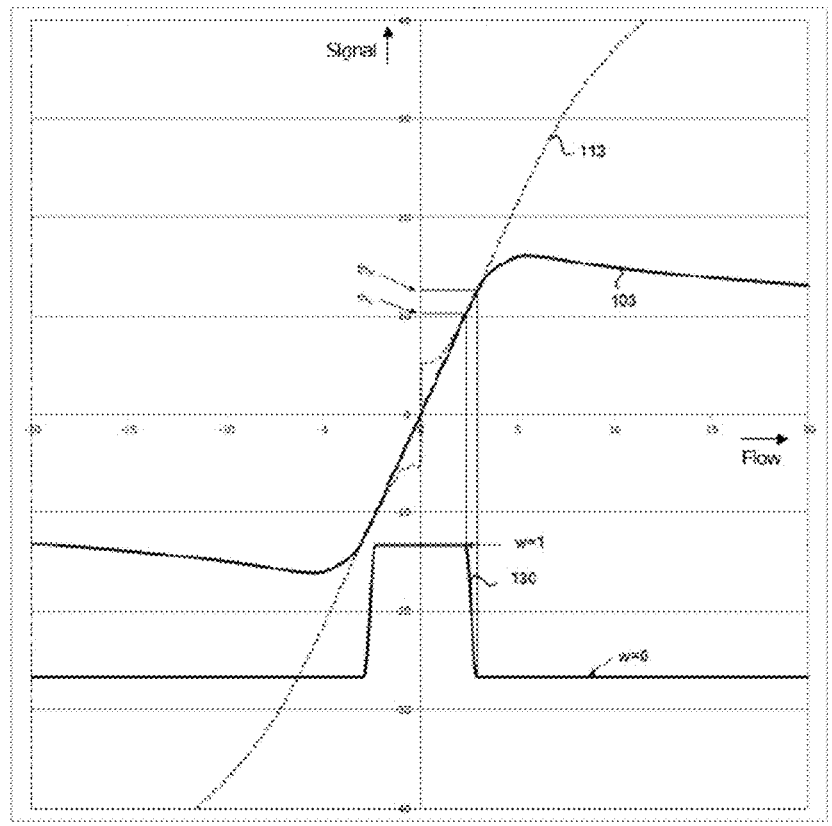
FIG. 20 depicts the signals of FIG. 19, together with an exemplary weighting function.

FIG. 20 depicts the transformed sum temperature signal 113, the transformed difference temperature signal 103 and the weighting function w. Different to the previous Figures, the scaling has been adapted so that the section surrounding the origin is enlarged.

For determining the weighting function w, two switching thresholds $th_H$ and $th_L$ are defined to correspond to the transformed sum temperature signal at the start and the end of the desired transition section. In FIG. 20, they are depicted as the lines identified as $th_H$ and $th_L$.

As long as the transformed sum temperature 113 is below $th_L$, only the difference temperature should be taken into account, the weighting function is thus 1. If the transformed sum temperature 113 is above $th_H$ and $th_L$, only the sum temperature should be taken into account, the weighting function is then 0. It will be understood that the threshold $th_L$ may correspond to the turning point threshold discussed above, and that the threshold $th_H$ may correspond to the second steep threshold discussed above, though the threshold values may be different because of the transformation.

Between $th_H$ and $th_L$, the weighting function could simply progress linearly (as also discussed above). As a further example for a continuous differentiable function, a cosine-shaped transition is used.

The weighting function is thus defined in sections as followed:

for $s_1(f) < th_L$: $\quad w = 1$ for $th_L \leq s_1(f) \leq th_H$: $\quad w = \frac{1}{2} \cdot \left( \cos\left( \frac{th_L - s_1(f)}{th_H - th_L} \cdot \pi \right) + 1 \right)$ for $s_1(f) > th_H$: $\quad w = 0$ The weighting function is depicted as curve 130 in FIG. 20.

The calculated weighting function w is now applied to the transformed temperature signals $d_1(f)$ and $s_1(f)$ to obtain a combined sensor signal c(f):

$$c(f) = w \cdot d(f) + (1-w) \cdot s(f)$$

Figure 21:
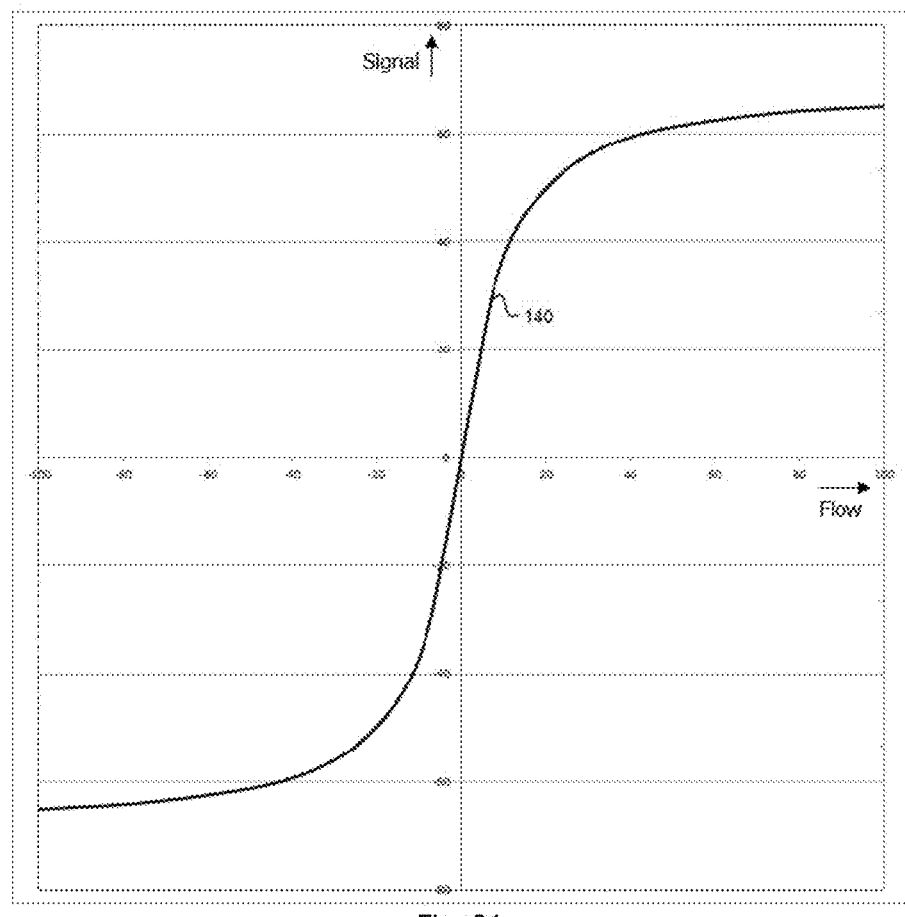
FIG. 21 depicts a composed signal.

This combined sensor signal is depicted as curve 140 in FIG. 21. The signal is continuously rising over the complete measuring section so that the signal values can always be assigned unambiguously to a flow rate.

However, the relation between the combined sensor signal 140 and the flow is not linear, as no linearization has been performed hitherto.

To obtain the measured flow rate based on the combined sensor signal, the inverse function of c(f) is needed.

This function is determined by a calibration. Here, different known flow rates are guided through the sensor, wherein the actual flow is checked, e.g., by means of a calibrated flow sensor or by means of a scale. For each flow rate, the combined sensor signal is determined so that the individual measurement points are located on curve 140. The inverse function is obtained by switching x- and y-axes. This function may be stored, e.g., by means of a lookup table. Another option is to approximate the values of the inverse function by means of a suitable mathematical function, e.g., a polynomial function.

This function can be stored in the analysis control of the sensor. During operation, only the combined sensor signal needs to be inserted to arrive at the measured flow rate.

The calibration is desirable due to the non-linear behavior of the sensor. Depending on how great the exemplary variation of the sensors caused by manufacturing tolerances are, individual sensors may behave differently. In such a case, it may be advantageous to calibrate each sensor individually.

In case the sensor is used with different solvents, it may be advantageous to perform a calibration with every individual solvent.

Still further embodiments of the present invention will now be described.

As described, at high flow rates, the difference temperature signal may be used instead of the sum temperature signal. Depending on the behavior of the flow sensor, this may be advantageous.

In the embodiment that has just been described, such a usage of the difference temperature signal at high flow rates has been omitted for sake of simplicity of description. However, it will be understood that such a usage of the difference temperature signal is also possible for the just described embodiment.

In such a case it may be advantageous that the transformation of the difference temperature signal is done so that the slope at high flows has the same sign as the transformed sum temperature signal and so that overlap sections result in which both signals are approximately the same.

This may be done by transforming the difference temperature signal stepwise, i.e., the transformation is done in a different manner for high flow rates than for low flow rates. The change of the section is done in a section where the sum temperature signal is well analyzable, i.e., in a section where the usage of the difference temperature signal is not necessary.

The discussed transformation of the signals were very simple (but still functional). This has been done to facilitate an easy understanding. As the transformation is only a mathematical mapping, completely different transformations may be used, too. For example, for the transformation of the sum temperature function, an exponential part of the sum temperature function may be added, to obtain a better linearity at high flow rates.

In such a case, the transformed sum temperature function would be as follows:

$$s_2(f) = (c_1 \cdot e^{(s(f)-c_2) \cdot c_3} + (s(f)-c_2) \cdot c_4 + c_5) \cdot \text{sign}(d(f))$$

Here, $c_1$ to $c_5$ are constants, which may be determined so that the resulting sum temperature signal $s_2$ is monotonously increasing and so that the signals can be well combined.

It may be surprising that the transformation may be performed in almost any manner. The reason is that the usage of another transformation process results in another combined sensor signal; however, this is reversed again by means of the calibration.

For any combined sensor signal, it is desirable that it exhibits a relevant and monotonously increasing or decreasing relation to the actual flow. If this is met, the combination of different transformation functions are mathematically equivalent if they are combined with the appropriate calibration functions.

Also completely different mathematical procedures, such as two-dimensional transformation functions, may be used. However, it is generally desirable that they yield a combined function meeting the above discussed characteristics.

It is also possible to already take the weighting function into account when transforming the signals. In the sections where one of the signals is not relevant, it has been multiplied by the weighting function 0, in accordance with the above discussed rationales. If, e.g., using a transformation so that the transformed signal is approximately constant in these sections, changes of the sensor signal in these sections also have no impact on the combined signal. This way weighting functions may be integrated into the transformation.

By using a two-dimensional transformation, the sum temperature signal and the difference temperature signal can be taken into account simultaneously, and thus generate a combined signal without explicitly using a weighting function.

All these combinations of sum and difference temperature signals are possible, according to embodiments of the present invention.

Figure 17:
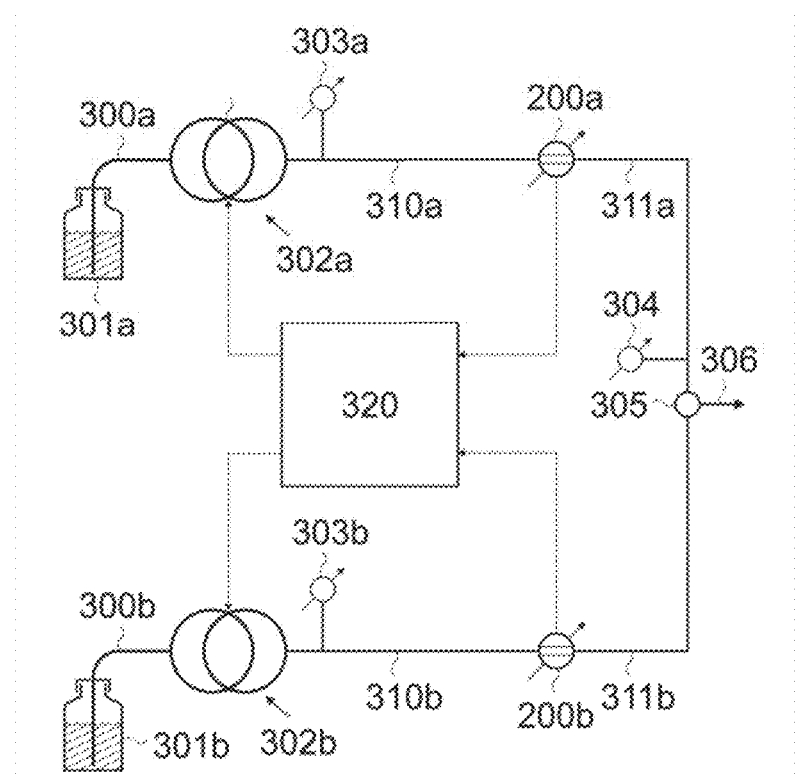
FIG. 17 depicts an HPLC system according to embodiments of the present invention.

The described embodiments may be used in an HPLC pump. In that regard, reference is made to FIG. 17. FIG. 17 shows, in an exemplary manner, the use of the described embodiment in a binary HPLC pump that has two solvent channels.

Via the intake pipes 300a and 300b, two pump blocks 302a and 302b aspirate the solvent from solvent containers 301a and 301b. Pressure sensors 303a and 302b detect the pressures at the outlets of the pump blocks 302a, 302b. Via connection lines 310a and 310b, the solvents reach temperature-controlled flow sensors 200a and 200b according to embodiments of the invention, and from there are transported through connection capillaries 311a and 311b to a mixer 305. The latter combines the two partial flows and makes them available for the rest of the HPLC system at outlet 306 of the pump.

The temperature-controlled flow sensors 200a and 200b according to embodiments of the invention constantly measure the two partial flows and forward the measurement values to a control unit 320, which is indicated by the two effect arrows. The control unit 320 compares the measured partial flows to the corresponding reference values, which result from the solvent composition that is desired at a given point in time and the desired total flow rate. The control unit 320 is designed to keep the deviations between the reference and actual values as small as possible by controlling the operating speeds of the two pump blocks 302a and 302b accordingly. This is indicated by the effect arrows between the control unit 320 and the pump blocks 302a, 302b. At least one of the two connections 311a or 311b advantageously has a certain minimum flow resistance in order to decouple the two solvent channels from each other under cybernetic aspects and to dampen the control loop. The required height of this flow resistance depends on the realization of the total system and especially on the set control parameters. A higher flow resistance facilitates faster and more accurate controlling, but on the other hand it creates a relevant pressure loss at high flow rates, whereby the maximal pressure available at the exit is correspondingly reduced.

For measuring the pressures at the exit outlet, a system pressure sensor 304 is provided. In principle, it is not a necessary feature for the functionality of the system, and neither are the pressure sensors 303a and 303b, so they are to be regarded as optional features.

The described embodiments expand the usable measuring range so strongly by the thermal flow sensors that the entire low flow range is covered.

The expansion is achieved, inter alia, by combining different measuring modes into a single continuous measuring range. At that, at least in the overlapping areas, the signals of the different measuring modes are recorded at the same time or quasi at the same time, and are combined into a single continuous signal.

E.g., in order to meet the extremely high requirements with respect to precision and reproducibility as they apply in the application of the invention in HPLC, the thermal flow sensor itself as well as the solvent that enters the sensor may also be temperature-controlled.

As a result of these measures, a substantially larger measuring range is covered than the conventional thermal flow sensors, while at the same time offering a higher degree of precision.

In particular, flow sensors according to embodiments of the invention may facilitate high-precision measurement of flow rates between just a few nL/min up to at least 100 µL/min within a single continuous measuring range.

Thanks to the application of the flow sensor according to embodiments of the invention in an HPLC pump having an active flow control, the dynamic range or the range of usable flow rates can be expanded to cover the entire low flow range between just a few nL/min up to approximately 100 µL/min.

In the entire mentioned range, a precision and reproducibility satisfying HPLC requirements may be obtained. This is achieved in a single continuous operating range without any exchange or switching of components.

Another advantage of the invention may be that, as compared to a flow control according to the state of the art that works with conventional thermal flow sensors, it requires only very little additional effort.

While certain preferred embodiments have been described with reference to the Figures, it will be understood that these embodiments are not intended to limit the scope of the present invention. What has been explained in this document is the basic principle of embodiments of the invention with readily available components. The most expedient embodiment from the current technical perspective has been described. Apart from that, various other embodiments are conceivable. Such other embodiments may possibly be more expedient depending on the overall technical concept and the characteristics of the used components.

When discussing the structure and the functional principle of the flow sensor (see the flow sensor depicted in FIG. 10, for example), an embodiment was chosen in which the heating element and the temperature sensors are all positioned at the same side of the capillary. Numerous other embodiments are conceivable, in particular such embodiments in which the heating element and/or the temperature sensors enclose the sensor capillary, such as for example a heating coating that is applied to the outer wall of the capillary. In that case, temperature profiles would result that are rotationally symmetrical with respect to the capillary axis, for example. However, this would not have any influence on the basic functionality of the flow sensor and the realization according to the invention.

It has been described that the differential temperature signal is analyzed at low flow rates, the sum temperature signal is analyzed at slightly higher flow rates, and the differential temperature signal is analyzed again at high flow rates, as the latter provides a higher precision in this range. Depending on the specific technical realization or the characteristics of the sensor, the sum temperature signal can also reach a good precision at high flow rates. In that case, the differential temperature signal could only be analyzed at low flow rates.

Current flow sensors analyze the sum temperature signal at higher flow rates, as far as they have different analyzing modes at all. The sum temperature signal reflects the amount of heat that is dissipated from the sensor element through the liquid, and namely independently of the direction of the flow. Alternatively, it would also be possible to obtain the sum temperature signal only from one of the two temperature sensors that are present in the sensor, even though this has various disadvantages, such as that the signal becomes direction-dependent, for example.

The shown embodiment of the eluent preheater is to be understood merely as an exemplary embodiment. When using a passive eluent preheater without its own active temperature control, it is not the type of construction that is relevant, but rather it is only important that a sufficiently small thermal resistance is reached between the temperature-controlled surface and the medium.

Instead of using a passive eluent preheater, the temperature control of the medium can also be performed by means of active heating of a component through which the medium flows by using a controlled heating element. In that case, a temperature sensor measures the actual temperature of the liquid preferably downstream from the heating element and a control circuit controls the heating power so that the temperature is equal to a set value. In this solution the thermal resistance between the temperature control and the medium is not critical.

It is also possible to detect the influence of the temperature on the signal of the flow sensor in the entire operating range of the sensor and across the expected temperature range, and to perform a mathematical correction. In this way, there would no longer be the necessity to temperature-control the sensor and/or the medium itself.

In the described embodiment for temperature control, the entire housing of the sensor and of the eluent preheater is temperature-controlled. In this manner, the invention can be realized with commercially available components. Instead, it is also possible to have a sensor in which the temperature control is already integrated. The eluent preheater can also be integrated into the housing of the sensor. In this manner, a smaller type of construction is facilitated so that also less power is needed for temperature control. This in turn facilitates a temperature control via Peltier elements that can also provide active cooling, so that it is no longer necessary to temperature-control to a value that is higher than the highest operating temperature that is to be expected.

The flow sensor can be designed in such a way that the sum temperature as well as the differential temperature can be read simultaneously. It is also possible to integrate the linearization and combination of modes into the sensor, so that the sensor itself is rendered capable of providing a correct signal in the entire range.

As far as the application of the invention in HPLC is concerned, the description was implicitly based on pump blocks that can generate a continuous solvent flow. However, especially in the low flow range, sometimes so-called syringe pumps are used, which have to be refilled either at predetermined intervals or at the latest at the point when the syringe is empty. The invention can be used in the same manner in that case, as well.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be accidental. That is, unless otherwise specified or unless clear to the skilled person, the order in which steps are recited may be accidental. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

While in the above, preferred embodiments have been described with reference to the accompanying drawings, the skilled person will understand that this embodiment was provided for illustrative purpose only and should by no means be construed to limit the scope of the present invention, which is defined by the claims.

What is claimed is:

1. A method for measuring a flow rate of a fluid in a tube, the method comprising:
heating the fluid in the tube with a heating element;
measuring a first signal with a first temperature sensing element of the fluid in the tube at a first location;
measuring a second signal with a second temperature sensing element of the fluid in the tube at a second location, the second location being different from the first location;
calculating at least one temperature signal based on the second signal and the first signal, in which the calculating the at least one temperature signal comprises:
calculating a difference temperature signal based on a difference between the second signal and the first signal; and
calculating a sum temperature signal based on a sum of the second signal and the first signal; and
deriving the flow rate based on the at least one temperature signal, wherein the deriving the flow rate is based on a weighted combination of the sum temperature signal and the difference temperature signal, in which a sum temperature weight and a difference temperature weight is determined based on the sum temperature signal.

2. The method of claim 1, in which the method is performed in a flow measuring system, the flow measuring system comprising: the tube; the heating element; the first temperature sensing element; and the second temperature sensing element, the method further comprising:
controlling a temperature of the flow measuring system and controlling a temperature of the fluid before the fluid enters the tube so that the temperature of the flow measuring system and the temperature of the fluid before the fluid enters the tube are equal.

3. The method of claim 2, in which the flow measuring system further comprises: a data processing apparatus, in which the deriving of the flow rate is performed by the data processing apparatus.

4. The method of claim 1 where the sum temperature signal is above a turning point threshold, the sum temperature weight is zero and the difference temperature weight is one.

5. The method of claim 4 where the sum temperature signal is between the turning point threshold and a second steep threshold, in which the turning point threshold is greater than the second steep threshold, the sum temperature weight is calculated with a first equation, the first equation comprising:

$$\text{sum temperature weight} = \frac{\text{sum temperature signal} - \text{turning point threshold}}{\text{second steep threshold} - \text{turning point threshold}}$$

in which the difference temperature weight is calculated with a second equation, the second equation comprising:

difference temperature weight=1−sum temperature weight.

6. The method of claim 5, in which deriving the flow rate comprises:
calculating a first product of the sum temperature weight and the sum temperature signal;
calculating a second product of the difference temperature weight and the difference temperature signal; and
calculating the weighted combination of the sum temperature signal and the difference temperature signal based on a sum of the first product and the second product.

7. The method of claim 4 where the sum temperature signal is between a second steep threshold and a first steep threshold, in which the turning point threshold is greater than the first steep threshold and the second steep threshold, and the second steep threshold is greater than the first steep threshold, the sum temperature weight is one and the difference temperature weight is zero.

8. The method of claim 7 where the sum temperature signal is between a first steep threshold and a flat threshold, in which the turning point threshold and the second steep threshold are both greater than the first steep threshold and the flat threshold, and the first steep threshold is greater than the flat threshold, the difference temperature weight is calculated with a third equation, the third equation comprising:

$$\text{difference temperature weight} = \frac{\text{sum temperature signal} - \text{first steep threshold}}{\text{flat threshold} - \text{first steep threshold}}$$

in which the sum temperature weight is calculated with a fourth equation, the fourth equation comprising:

sum temperature weight=1−difference temperature weight.

9. The method of claim 8, in which deriving the flow rate comprises:
calculating a first product of the sum temperature weight and the sum temperature signal;
calculating a second product of the difference temperature weight and the difference temperature signal; and
calculating the weighted combination of the sum temperature signal and the difference temperature signal based on a sum of the first product and the second product.

10. The method of claim 7 where the sum temperature signal is less than the flat threshold, in which the flat threshold is less than each of the turning point threshold, first steep threshold and the second steep threshold, the sum temperature weight is zero and the difference temperature weight is one.

11. The method of claim 10, in which deriving the flow rate comprises:
calculating a first product of the sum temperature weight and the sum temperature signal;
First Inventor: Gervin Ruegenberg calculating a second product of the difference temperature weight and the difference temperature signal; and
calculating the weighted combination of the sum temperature signal and the difference temperature signal based on a sum of the first product and the second product.

12. The method of claim 1, wherein the sum temperature weight corresponds to the sum temperature signal and the difference temperature weight corresponds to the difference temperature signal, and wherein a sum of the sum temperature weight and the difference temperature weight equals 1; wherein
when the sum temperature is above a turning point threshold, the difference temperature weight is at least 0.7;
when the sum temperature signal is in the range between a first steep threshold and a second steep threshold, the sum temperature weight is at least 0.7; and
when the sum temperature signal is less than a flat threshold, the difference temperature weight is at least 0.7,
wherein the turning point threshold is greater than the first steep threshold, the second steep threshold, and the flat threshold, the first steep threshold is greater than the second steep threshold and the flat threshold, the second steep threshold is greater than the flat threshold.

13. The method of claim 1, wherein the method further comprises
linearizing a relationship between the flow rate and the difference temperature signal; and
linearizing a relationship between the flow rate and the sum temperature signal.

14. The method of claim 1, in which the fluid is a liquid.

15. The method of claim 1, in which the first temperature sensing element and the second temperature sensing element are on opposite sides of the heating element.

16. The method of claim 1, in which the tube is a capillary having an inner diameter of 15 to 500 micrometers.

17. A flow measuring system for measuring a flow rate of a fluid in a tube, the system comprising:
A) the tube;
B) a heating element configured to heat the fluid in the tube;
C) a first temperature sensing element configured to measure a first signal of the fluid in the tube at a first location;
D) a second temperature sensing element configured to measure a second signal of the fluid in the tube at a second location, the second location being different from the first location; and
E) a data processing apparatus, wherein the data processing apparatus is configured to
i) calculate a difference temperature signal based on a difference between the second signal and the first signal;
ii) calculate a sum temperature signal based on a sum of the second signal and the first signal; and
ii) derive the flow rate based on at least one temperature signal, wherein the deriving the flow rate is based on a weighted combination of the sum temperature signal and the difference temperature signal, in which a sum temperature weight and a difference temperature weight is determined based on the sum temperature signal, wherein the system further comprises:
F) at least one temperature control element configured to control a temperature of the flow measuring system, and a fluid temperature control element configured to control a temperature of the fluid.

18. The flow measuring system according to claim 17, wherein the at least one temperature control element is selected from a group consisting of a heating device and a peltier element.

19. The flow measuring system according to claim 17 further comprises:
G) a heat transfer element configured to conduct heat between the at least one temperature control element and the flow measuring system.

20. The flow measuring system of claim 17, in which the first temperature sensing element and the second temperature sensing element are on opposite sides of the heating element.

21. A pump system comprising:
A) a first pump configured to pump a first fluid to a mixer via a first tube;
B) a second pump configured to pump a second fluid to the mixer via a second tube;
C) a first flow measuring system configured to measure a first flow rate of the first fluid in the first tube, the first flow measuring system comprising:
i) the first tube;
ii) a first heating element configured to heat the first fluid in the first tube;
iii) a first temperature sensing element configured to measure a first signal of the first fluid in the first tube at a first location;
iv) a second temperature sensing element configured to measure a second signal of the first fluid in the first tube at a second location, the second location being different from the first location; and
v) a data processing apparatus, wherein the data processing apparatus is configured to
a) calculate a first difference temperature signal based on a difference between the second signal and the first signal;
b) calculate a first sum temperature signal based on a sum of the second signal and the first signal; and
c) derive the first flow rate based on at least one temperature signal, wherein the deriving the first flow rate is based on a weighted combination of the sum temperature signal and the difference temperature signal, in which a sum temperature weight and a difference temperature weight is determined based on the sum temperature signal, wherein the first flow measuring system further comprises:
vi) at least one first temperature control element configured to control a temperature of the first flow measuring system, and a first fluid temperature control element configured to control a temperature of the first fluid; and
D) a pump control unit configured to
i) receive a first flow signal corresponding to the first flow rate from the first flow measuring system; and
ii) adjust a first setting of the first pump.

22. The pump system of claim 21 further comprising
E) a second flow measuring system configured to measure a second flow rate of the second fluid in the second tube, the second flow measuring system comprising:
i) the second tube;
ii) a second heating element configured to heat the second fluid in the second tube;
iii) a third temperature sensing element configured to measure a third signal of the second fluid in the second tube at a third location;
iv) a fourth temperature sensing element configured to measure a fourth signal of the second fluid in the second tube at a fourth location, the third location being different from the fourth location; and v) the data processing apparatus is further configured to
  a) calculate a second difference temperature signal based on a difference between the third signal and the fourth signal;
  b) calculate a second sum temperature signal based on a sum of the third signal and the fourth signal; and
  c) derive the second flow rate based on at least one temperature signal, wherein the deriving the second flow rate is based on a weighted combination of the sum temperature signal and the difference temperature signal, in which a sum temperature weight and a difference temperature weight is determined based on the sum temperature signal, wherein the second flow measuring system further comprises:
vi) at least one second temperature control element configured to control a temperature of the second flow measuring system, and a second fluid temperature control element configured to control a temperature of the second fluid; and
F) the pump control unit is further configured to
  i) receive a second flow signal corresponding to the second flow rate from the second flow measuring system; and
  ii) adjust a second setting of the second pump.

\* \* \* \* \*

UNITED STATES PATENT AND TRADEMARK OFFICE
CERTIFICATE OF CORRECTION

PATENT NO. : 10,962,394 B2
APPLICATION NO. : 16/114523
DATED : March 30, 2021
INVENTOR(S) : Ruegenberg et al.

Page 1 of 1

It is certified that error appears in the above-identified patent and that said Letters Patent is hereby corrected as shown below:

In the Claims

Claim 11, Column 46, Line 61: delete "First Inventor: Gervin Ruegenberg"

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*